United States Patent
Goldman

(10) Patent No.: US 11,928,321 B2
(45) Date of Patent: Mar. 12, 2024

(54) EQUIVALENT FRACTION TEMPLATES

(71) Applicant: Alfred Goldman, New York, NY (US)

(72) Inventor: Alfred Goldman, New York, NY (US)

( * ) Notice: Subject to any disclaimer, the term of this patent is extended or adjusted under 35 U.S.C. 154(b) by 816 days.

(21) Appl. No.: 16/522,375

(22) Filed: Jul. 25, 2019

(65) Prior Publication Data
US 2020/0034027 A1     Jan. 30, 2020

Related U.S. Application Data

(60) Provisional application No. 62/703,252, filed on Jul. 25, 2018.

(51) Int. Cl.
| | |
|---|---|
| G09B 19/02 | (2006.01) |
| G06F 3/0482 | (2013.01) |
| G06F 3/04845 | (2022.01) |
| G09B 23/02 | (2006.01) |

(52) U.S. Cl.
CPC ........ *G06F 3/04845* (2013.01); *G06F 3/0482* (2013.01); *G09B 19/02* (2013.01); *G09B 19/025* (2013.01); *G09B 23/02* (2013.01)

(58) Field of Classification Search
CPC ...... G06F 3/0482; G09B 19/02; G09B 19/025
USPC ....................................................... 434/196
See application file for complete search history.

(56) References Cited

U.S. PATENT DOCUMENTS

| | | |
|---|---|---|
| 356,167 A | 1/1887 | Shannon |
| 1,098,330 A | 5/1914 | Pannenkowa |
| 1,174,689 A | 3/1916 | Coleman |
| 1,292,816 A | 1/1919 | Leslie |
| 2,926,432 A | 3/1960 | Helberg |
| 2,930,146 A | 3/1960 | Cassel |
| 3,136,076 A | 6/1964 | Schott |
| 3,871,114 A | 3/1975 | Honig |
| 4,778,390 A | 10/1988 | Marans |
| 5,194,299 A | 3/1993 | Fry |

OTHER PUBLICATIONS

EAI Education, "The Master® Ruler Standard" www.eaieducation.com/Product/525067/The_Master%c2%ae_Ruler_Standard.aspx, © 2019 EAI Education Oakland, NJ 1-800-770-8010.

EAI Education, "The Master® Ruler: Transparent Standard" www.eaieducation.com/Product/525064/The_Master%c2%ae_Ruler_Transparent_Standard.aspx, © 2019 EAI Education Oakland, NJ 1-800-770-8010.

(Continued)

*Primary Examiner* — Kesha Frisby
(74) *Attorney, Agent, or Firm* — Cozen O'Connor

(57) ABSTRACT

Templates for identifying equivalent fractions in one example comprise a plate defining a plurality of aligned rows, each row having an equal length and representing a respective fraction. Each row defines a number of slots through the plate, positioned to divide a row into equal parts corresponding to the respective fraction. Slots or markers in respective rows corresponding to equivalent fractions are vertically aligned. An elongated slot may be provided on the template or on a separate template to draw a boundary to mark a fraction, identify equivalent fractions and perform mathematical operations. In another example, a first template includes a plurality of aligned rows with marks to indicate fractions and a second, transparent template for placement over the first template. Fractions may be drawn in a Unit box defined on the second template. Methods of using a template, and virtual templates, are also disclosed.

11 Claims, 23 Drawing Sheets

(56) References Cited

OTHER PUBLICATIONS

EAI Education, "Comparative Fraction Strips" www.eaieducation.com/Product/502801/Comparative_Fraction_Strips.aspx, © 2019 EAI Education Oakland, NJ 1-800-770-8010.

EAI Education, "Dry-Erase Student Fraction Number Lines—10 Sets of 4 Strips" www.eaieducation.com/Product/520597/Dry-Erase_Student_Fraction_Number_Lines_-_10_Sets_of_4_Strips.aspx, © 2019 EAI Education Oakland, NJ 1-800-770-8010.

EAI Education, "FracTrack®-Set of 5" www.eaieducation.com/Product/520559/FracTrack%c2%ae-Set_of_5.aspx, © 2019 EAI Education Oakland, NJ 1-800-770-8010.

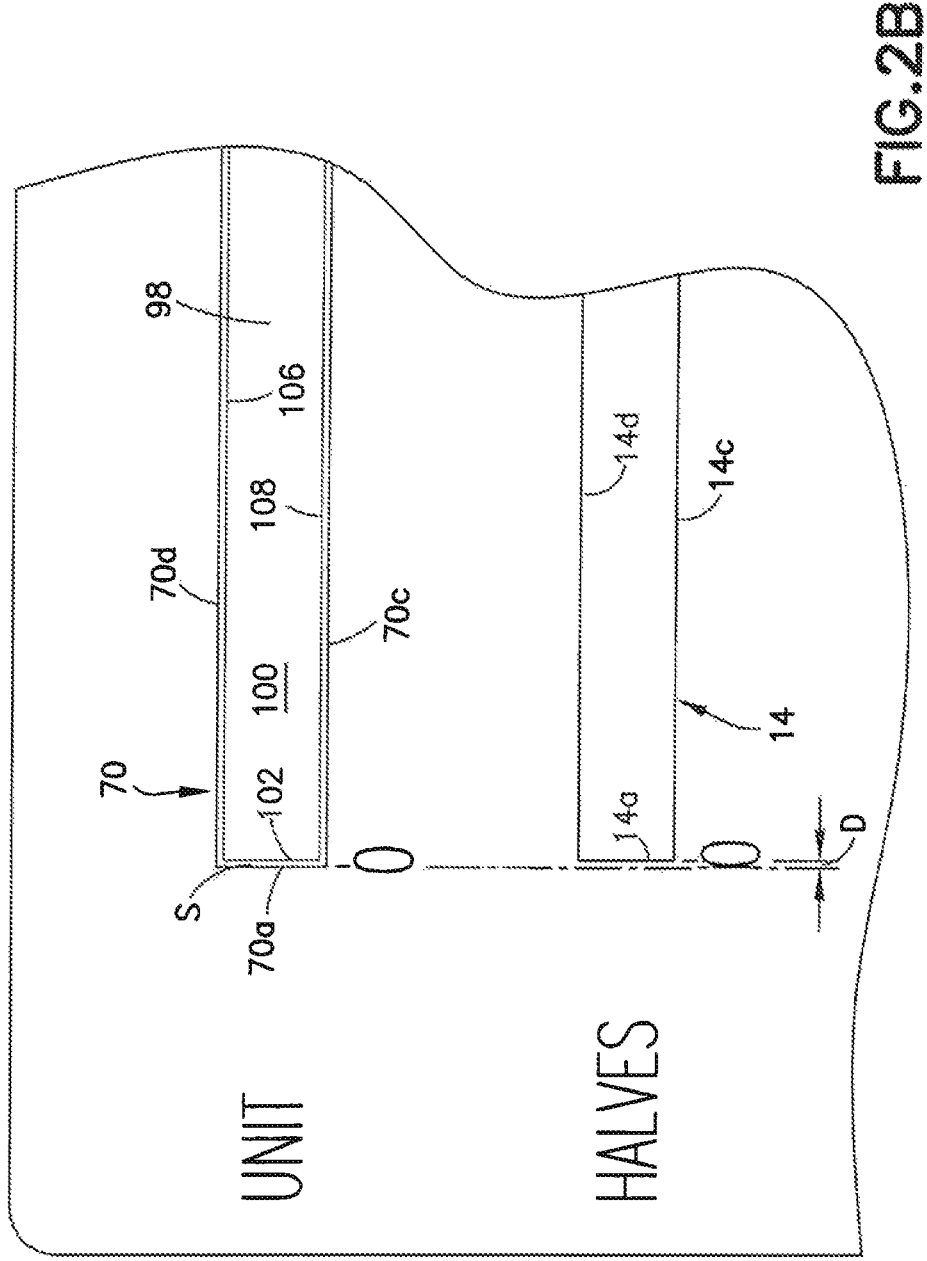

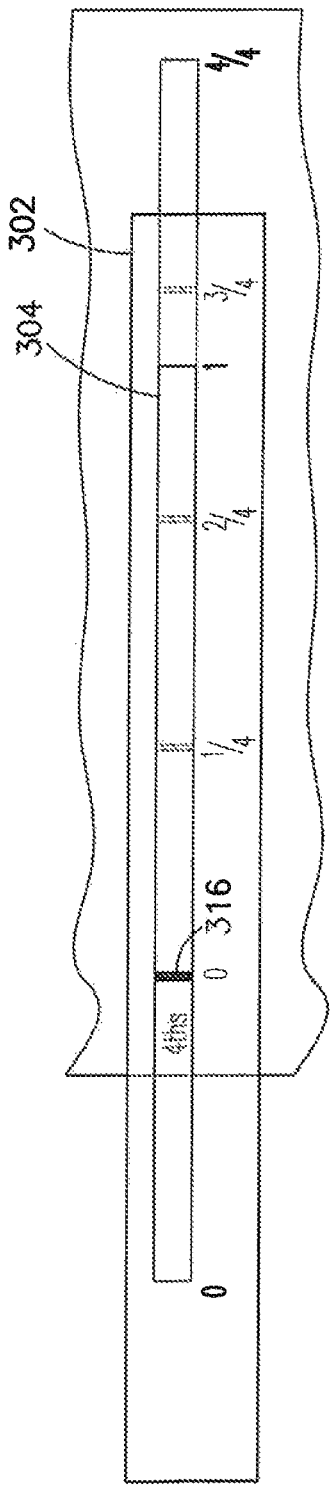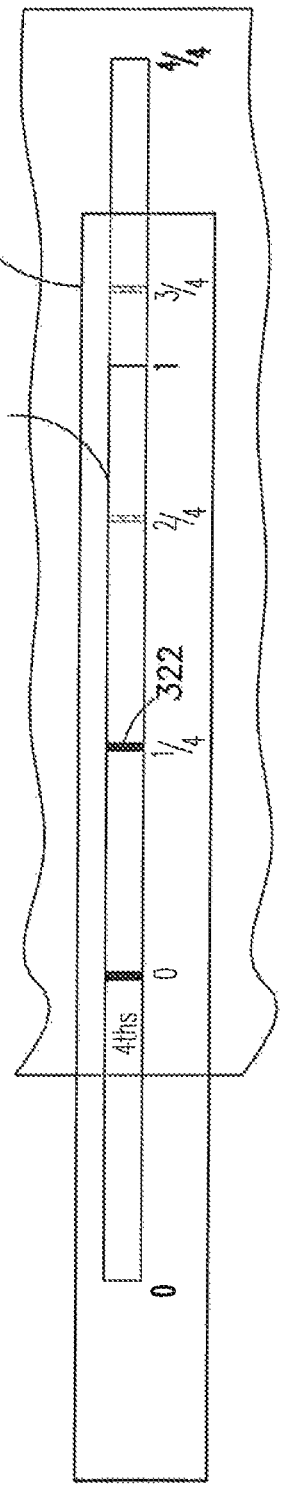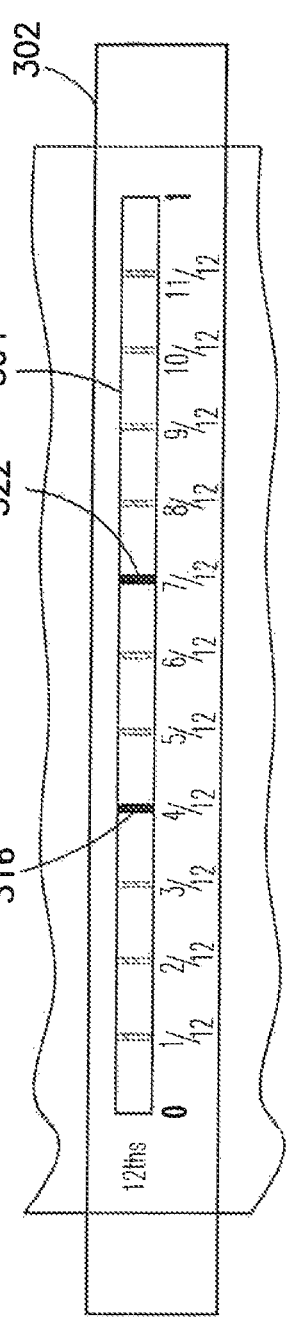

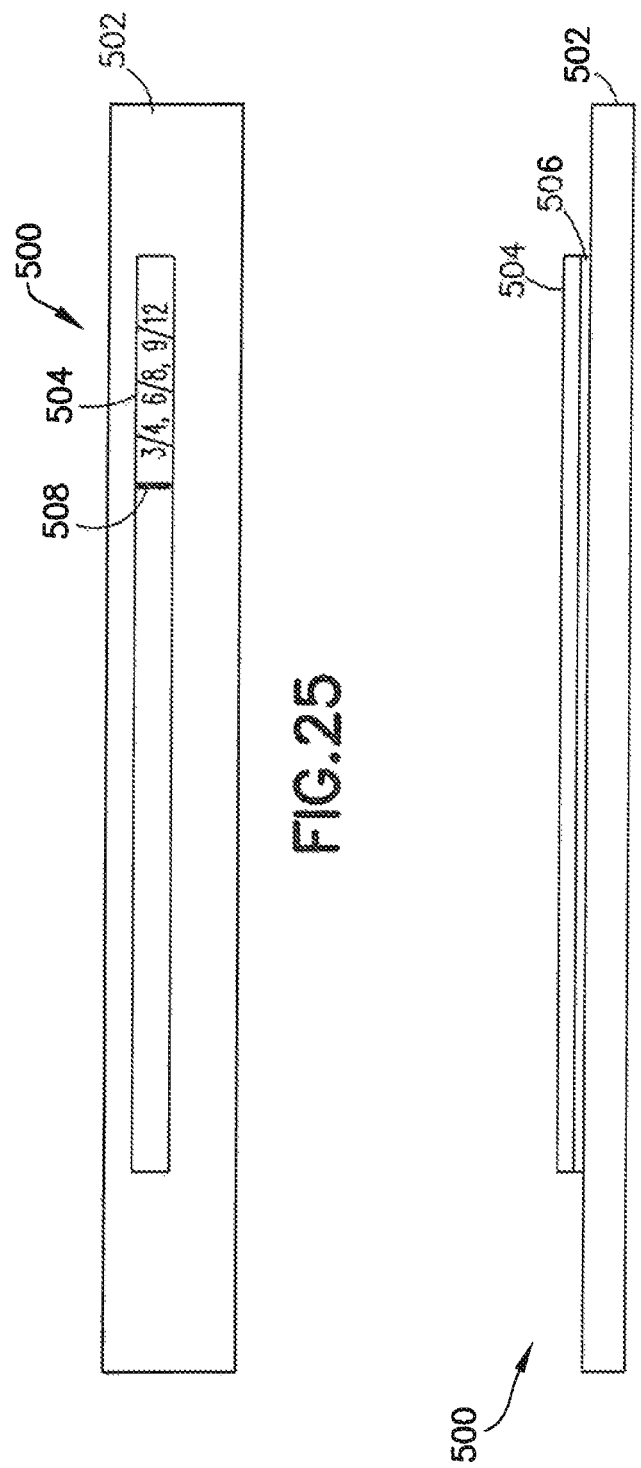

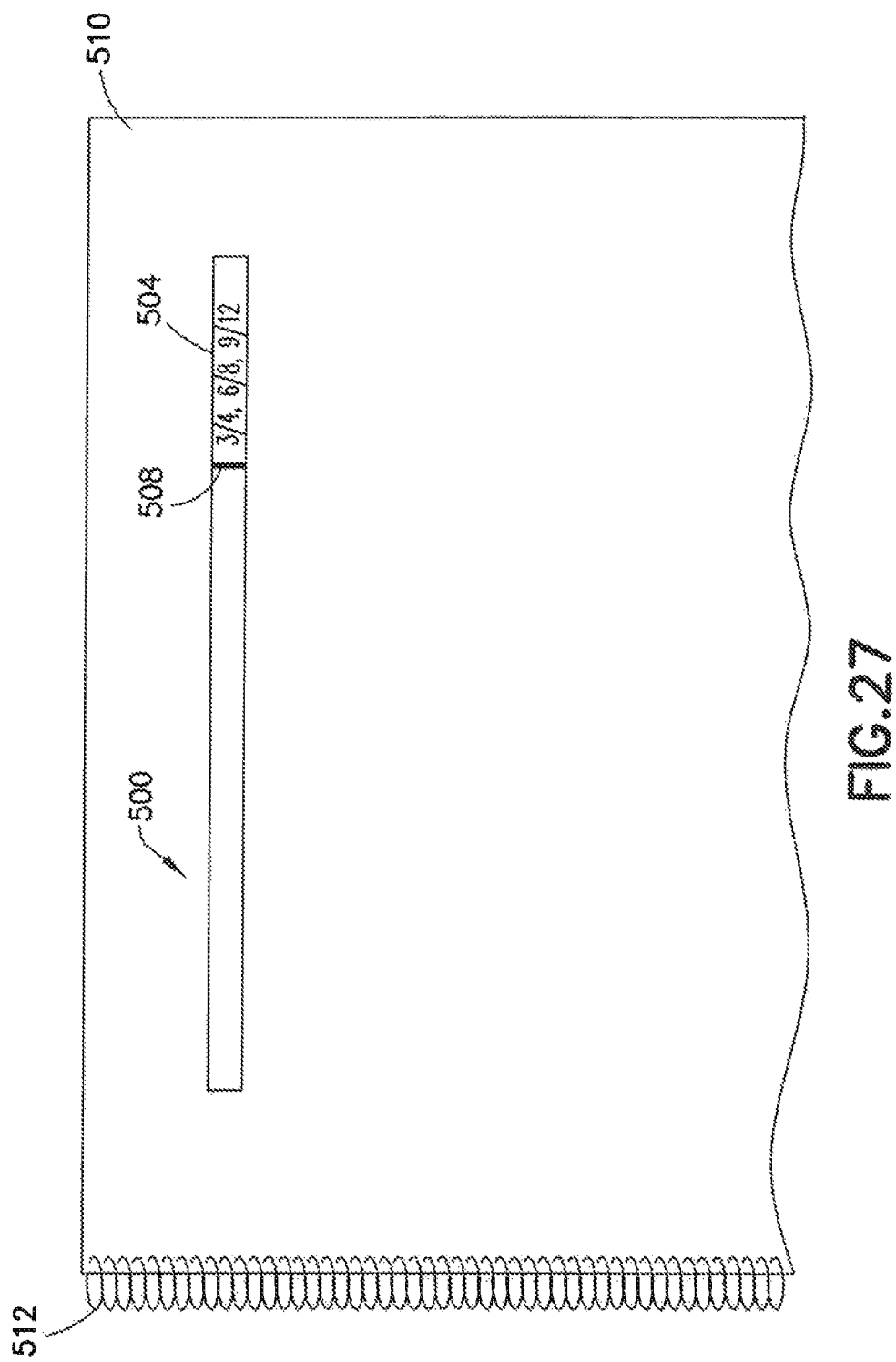

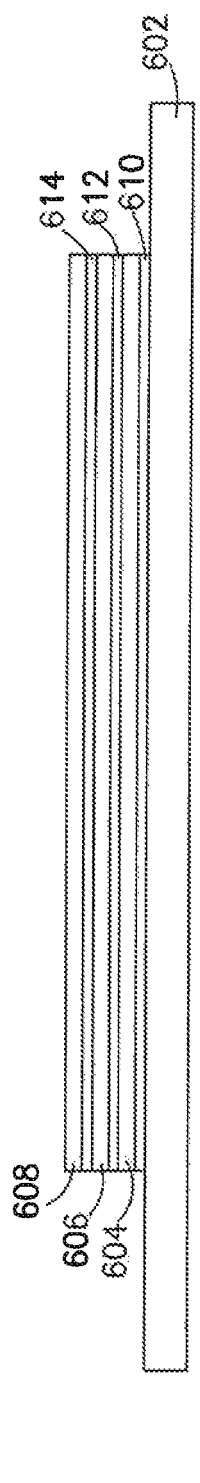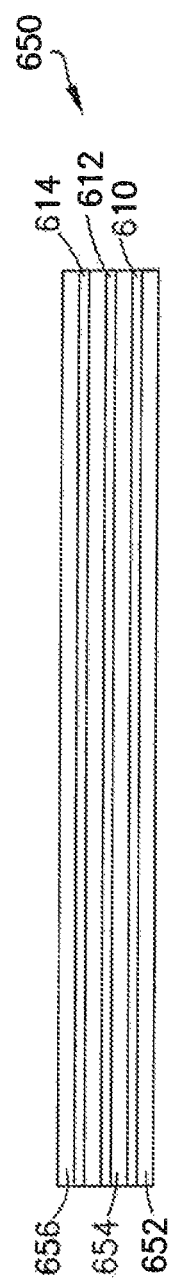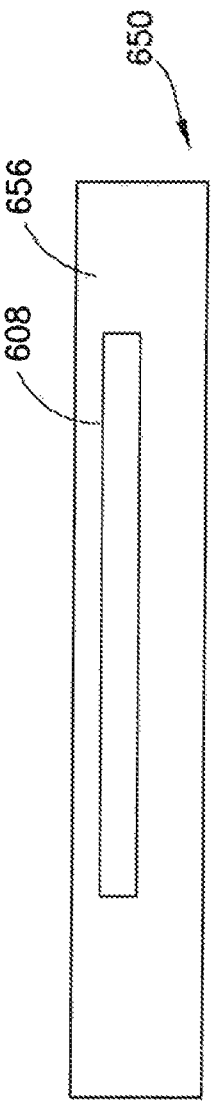

EQUIVALENT FRACTION TEMPLATES

RELATED APPLICATION

The present application claims the benefit of U.S. Provisional Patent Application No. 62/703,252, which was filed on Jul. 25, 2018 and is incorporated by reference herein.

FIELD OF THE INVENTION

Tools for learning mathematics, and more particularly, a template for identifying equivalent fractions and performing mathematical operations with fractions.

BACKGROUND OF THE INVENTION

It may be difficult for certain children to understand fractions, including the relative relationships between fractions having different denominators, as well as to add and subtract fractions. Adding and subtracting fractions having different denominators can provide particular difficulties for students. Some students may not be ready to advance to determining a common denominator and using equivalent fractions to solve such problems.

Fractions are typically taught as being parts of a whole. A number of hands-on devices are available to help students gain an intuitive feel for the concept of fractions by enabling comparisons of different parts of a whole and their corresponding fractional values. Charts including rows of fractions defined by different sized blocks, for example, are known. They may show the relative sizes of a limited number of different fractions, demonstrating the relationships between different fractions and enabling the identification of equivalent fractions. Such charts, however, are of limited utility in adding and subtracting fractions. Teachers typically show the chart in front of the class. Hands-on manipulation by students is not provided. Fractional sized blocks that do enable hands-on manipulation are also available. The blocks can be added to make a whole, but they may not assist in determining the result of the addition and subtraction of fractions with different denominators.

SUMMARY OF THE INVENTION

Improved tools to assist students in learning about fractions are needed. Embodiments of the invention provide hands-on templates to assist students in finding fractions equivalent to a selected fraction. In addition, embodiments of the invention provide hands-on templates to assist students in adding and subtracting fractions having the same and different denominators, for example. Finding equivalent fractions and performing additions and subtractions, and other calculations, are referred to collectively, herein as performing "mathematical operations."

Each student can have their own template, and can learn about fractions by interacting with the template under the guidance of a teacher and/or independently. Manipulating the template, drawing fractional lengths, and discovering equivalent fractions on their own could assist students in seeing patterns between fractions with different denominators, leading to better understanding of concepts. The templates are easily manipulated, carried, and stored so that the student can also take the templates home to be a part of or to assist in homework assignments. In addition, more fractions can be provided on the template in accordance with embodiments of the invention as compared with known devices.

In accordance with an embodiment of the invention, an apparatus, also referred to as a template, for identifying equivalent fractions is disclosed comprising a plate defining a plurality of aligned rows, each row having an equal length and representing a respective fraction. Each row has a first side, a second side opposite the first side, a top side, and a bottom side opposite the top side. The first sides of each row are vertically aligned and the second sides of each row are vertically aligned. Each row defines at least one slot through the plate, each of the at least one slots being located in a position in the row to divide a respective row into a number of equal parts corresponding to the fraction defined by the respective row. The number of parts is equal to a value of the denominator of the fraction defined by the respective row. Slots in rows corresponding to equivalent fractions are vertically aligned. In one example the boundary is a rectangle. In another example the boundary is a line.

The plate may further define an elongated slot through the plate, for drawing the boundary on a solid surface. The elongated slot may have dimensions equal to the length of each row, or the elongated slot may have dimensions greater than the dimensions of the plurality of rows, to accommodate the thickness of writing implement, such as a pencil or pen, for example.

The template may further comprise a second template separate from the first template. The second template comprises a second plate defining an elongated slot having dimensions equal to or greater than the dimensions of the plurality of aligned rows of the first template. The second template may further comprises a second elongated slot having a length greater than the length of the first elongated slot.

In accordance with another embodiment of the invention, an apparatus for identifying equivalent fractions is disclosed comprising a first plate defining a plurality of aligned first rows, each first row having an equal length and representing a respective fraction. Each first row has a first side, a second side opposite the first side, a top side, and a bottom side opposite the top side, wherein the first sides of each first row are vertically aligned and the second sides of each row are vertically aligned. Each first row defines at least one mark on the plate, in a position in the row to divide a respective row into a number of equal parts corresponding to the fraction defined by the respective row. The number of parts are being equal to a value of the denominator of the fraction defined by the respective row. Marks in rows corresponding to equivalent fractions are vertically aligned. A second, transparent plate separate from the first plate is also provided. The second plate defines a boundary having the same dimensions as the rows on the first plate, wherein, when the second plate is placed on top of the first plate, the boundary aligns with a selected one of the first rows.

A number of marks in each row is one less than the number of equal parts corresponding to the respective fraction defined by a respective row. The second template comprises a plurality of boundaries having the same dimensions. The second template may comprise a base, a removable strip, and an adhesive on an underside of the removable strip, to adhere the removable strip to the base. When the removable strip is removed from the base, adhesive remains on the removable strip so that it can be adhered to another surface. The boundary is defined on the removable strip.

In accordance with another embodiment of the invention, a method of performing a mathematical operation on fractions using a template is disclosed, where the template comprises a plurality of aligned rows, each row having an equal length and identifying a respective fraction. The method comprises indicating a first fraction on a surface, moving one of the template or the indicated first fraction with respect to the other, and aligning a second fraction on the template with the indicated first fraction. The aligned second fraction is equivalent to the indicated first fraction.

The method may further comprise again moving one of the template or the indicated first fraction with respect to the other and aligning a third fraction on the template with the indicated first fraction. The third fraction is equivalent to the indicated first fraction and the second fraction. The method may further comprise indicating the first fraction by indicating a third fraction on the surface, indicating a fourth fraction on the surface with respect to the indicated third fraction to form a sum or difference between the indicated third fraction and the fourth fraction, moving one of the template or the first fraction resulting from the indicated sum or difference with respect to the other, and aligning the second fraction on the template with the sum or difference.

The template may further comprise a plate defining a plurality of aligned rows, each row having an equal length and representing a respective fraction, each row having a first side, a second side opposite the first side, a top side, and a bottom side opposite the top side, wherein the first sides of each row are vertically aligned and the second sides are vertically aligned. Each row defines a number of slots through the plate, each of the at least one slots being located in a position in the row to divide a respective row into a number of equal parts corresponding to the fraction defined by the respective row, the number of parts being equal to a value of the denominator of the respective fraction of each row. Slots in respective rows corresponding to equivalent fractions are vertically aligned. The method comprises indicating the selected first fraction on a surface by providing a mark in a first slot corresponding to the fraction in the template, moving the template with respect to the surface, and aligning a second slot corresponding to the indicated first fraction on the template with the mark to identify a fraction equivalent to the indicated first fraction, on the template. The first fraction is indicated on the surface by drawing a boundary on the surface, the boundary having the same dimensions as each row, aligning a row defining the fraction of the indicated first fraction, with the boundary, and indicating the indicated first fraction on the solid surface, by providing a mark through the first slot, within the drawn boundary. As discussed above, the boundary may be a rectangle or a line, for example.

The first fraction may be indicated on a second template separate from the first template, the second template being transparent and moving the second template with respect to the first template. The method may further comprise indicating the first fraction on the second plate by marking the second plate with an erasable writing implement, erasing the mark on the second plate, and reusing the second plate to perform another mathematical operation with the first template. In another embodiment, the boundary is adhered and is removable from the second plate and the method further comprises, after indicating a first fraction on the second plate, removing the row from the first plate and adhering the boundary to a surface.

In another embodiment, the boundary is adhered and is removable from the second plate and the method further comprises, after indicating a first fraction on the second plate, removing the row from the first plate and adhering the boundary to a surface.

The template may be a virtual template displayed on a display of a user's processing device. The method comprises causing the first fraction to be indicated on the display device via an input device, causing one of the template or the identified first fraction to move with respect to the other one on the display via the input device, and aligning a second fraction on the template with the indicated first fraction.

The first template and the second template may each be virtual templates displayed on a display device, wherein the second template is moved with respect to the first template via an input device, and the second plate is marked via the input device.

In accordance with another embodiment of the invention, a system for performing mathematical operations is disclosed comprising a processing device, a display, and an input device. The processing device is configured to indicate a first fraction with respect to a boundary displayed on the display, responsive to the input device. The processing device is further configured to display a template on the display, the template comprising a plurality of aligned rows, each row having a length equal to the first length and indicating respective fractions within each row. The processing device is further configured to move one of the template or the region containing the indicated first fraction with respect to the other on the display, under the control of the input device, and align a second fraction on the template with the indicated first fraction. The aligned second fraction is equivalent to the indicated first fraction. The processing device may be further configured to display a second template on the screen and to indicate the first section with respect to a boundary on the second template, responsive to the input device.

BRIEF DESCRIPTION OF THE FIGURES

FIG. 2B is an enlarged view of a portion of the template of FIG. 1, showing a portion of the Unit box of FIG. 2A drawn within a portion of the horizontal extending slot in template of FIG. 1, and a portion of the Halves row;

FIGS. 17-22 show the use of the first template and the second template of FIGS. 12 and 13, respectively, in performing addition;

FIG. 25 is an example of a second template for use with the first template of FIG. 12, where the Unit box can be removed and placed in a notebook, for example;

FIG. 26 is a side view (not to scale) of the second template of FIG. 25;

FIG. 27 shows the Unit box of FIGS. 25 and 26, removed from the second template and applied to a student's notebook;

FIG. 29 is a side view of another example of a second template in accordance with this embodiment comprising a base and a plurality of stacked, removable Unit boxes;

FIG. 30 is a side view of another example of a second template in which the bases containing respective Unit boxes 56 are stacked and removable;

FIG. 31 is a top view of the second template of FIG. 30;

DETAILED DESCRIPTION OF THE FIGURES

Figure 1:
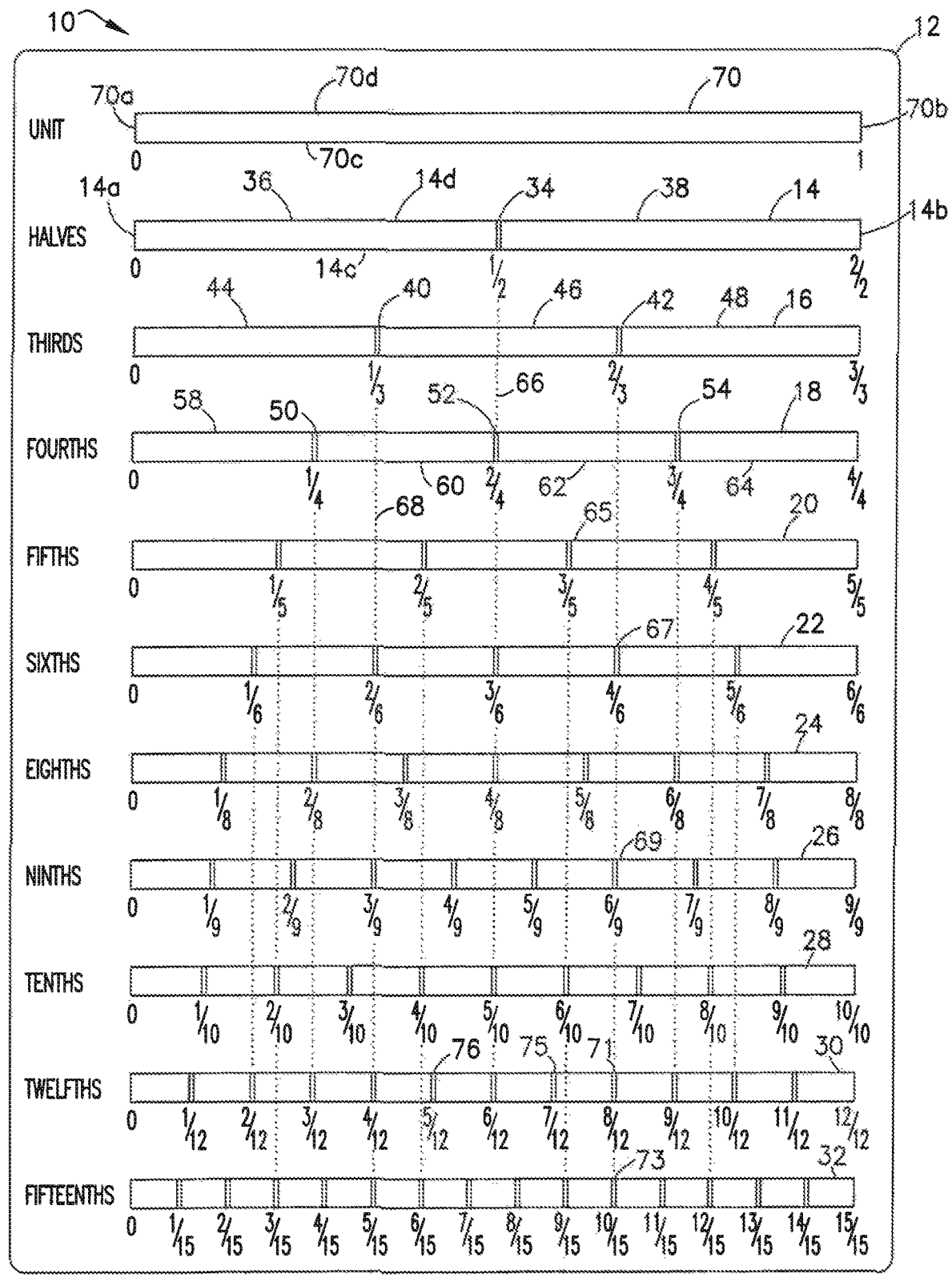
FIG. 1 is a front view of an example of an equivalent fraction template in accordance with an embodiment of the invention.

FIG. 1 is a front view of an example of an equivalent fraction template 10 in accordance with an embodiment of the invention. The template 10 comprises a sheet or plate 12 of plastic, which may be transparent. The plastic sheet 12 may be a rigid or semi-rigid plastic. Other materials, such as wood or cardboard, for example, may also be used. A plurality of rows are defined on the sheet 12 corresponding to respective fractions. The rows are also referred to as fraction rows. In this example, the rows are labeled by the respective name of the fraction corresponding to the row, on the left side. In the example of FIG. 1, ten (10) rows 14-32 of equal lengths are defined corresponding to Halves 14, Thirds 16, Fourths 18, Fifths 20, Sixths 22, Eighths 24, Ninths 26, Tenths 28, Elevenths 30, and Fifteenths 32. The rows 14-32 in this example have the same lengths, referred to a unity or one (1). The rows 14-32 are aligned, to accurately illustrate the relative sizes of the different fractions defined by each row. In the template 10 of FIG. 1, rows for sevenths, elevenths, thirteenths, and fourteenths are not provided so that other, more commonly used fractions can fit in the desired size template 12.

In this example, the dimensions of the template 10 are the same as or are slightly less than the size of letter paper (8½ inches×11 inches). Each row 14-32 and the Unit box may have lengths of five (5) to eight (8) inches, for example.

Three or more holes (not shown) may be provided on the left side of the template 10 so that the template may be clipped into a loose leaf or other such notebook, for example. Alternatively, the template 12 could be made larger and/or the heights of the rows could be decreased so that more rows could be included.

Each row 14-32 may be defined by a rectangle printed on the sheet 12. One or more slots are defined through the sheet 12 to divide each row into respective fractional parts of the entire length of the respective row. The slots may be vertical, rectangular slots, as shown in FIG. 1, for example. A slot 34 divides the Halves row 14 into two equal parts, a first half 36 and a second half 38. The slot 34 is also labeled ½ below the slot in this example, indicating that the length of each part of the slot is one-half (½) of the length of the entire row. Two slots 40, 42 divide the Thirds row 16 into three equal parts, a first third 44, a second third 46, and a third 48. Three slots 50, 52, 54 divide the Fourths row 18 into four equal parts, a first fourth 58, a second fourth 60, a third fourth 62, and a fourth 64. Similarly, four slots divide the Fifths row into five equal parts. These four (4) slots are not numbered for ease of illustration. An identifier of the value of the respective fraction defined by each slot, such as ½ in row 14, ⅓ and ⅔ in row 16, ¼, ²⁄₄, ¾ in row 18, etc. may be provided. The slots are wide enough for a line or other indication to be drawn in the slot, on a surface, with a writing implement such as a pencil or pen.

The slots may have a width of 3 mm or less, for example. The remaining rows 22-32 for sixths, eighths, ninths, tenths, twelfths, and fifteenths, respectively, are similarly divided by respective slots into equal fractional parts of the whole length. The number of slots in each row is one less than the number of parts the row is to be divided into, or one less than the denominator of the fraction defined by the row. While only selected slots in the rows 22-32 are numbered for ease of illustration, the slots and the parts of the remaining rows are labeled by the respective fraction that they define. As used herein, the term "slot" encompasses a vertically oriented rectangle or other shapes, such as a circle, oval, square, or rectangle, for example.

The Halves row 14 includes a left side 14a, a right side 14b, a bottom side 14c, and a top side 14d. The remaining rows 16-32 also include respective left sides and right sides, which are not numbered for ease of illustration. The left side of 14a of the Halves row 14 and the left side of the remaining rows 16-32, are each labeled zero "0". The left sides may also be referred to as an "origin" of each row defining a respective fraction. The right side 14b of the Halves row 14 and the right sides of the remaining rows are each labeled with a fraction equal to one (1) to indicate the whole fraction of the respective row. For example, the right side 14b of the Halves 14b and the remaining rows are Halves row 14 is labeled 2/2 and the right side of the Twelfths row 30 is labeled 12/12. Since the length of each row from the left side to the right side, respectively, is the same, the fractional parts of each row are in a proper relation to each other and the slots defining equivalent fractions are aligned. For example, the length of the first half portion 36 is equal in length to the first two quarter portions 58, 60 the first three sixth portions, the first four eighth portions, the first five tenth portions, etc. In addition, the slot 34 defining one-half (½), the slot 52 defining two-quarters (²⁄₄), the slot 65 defining three-sixths (³⁄₆), etc., are aligned. In this example, the heights of the fraction rows 14-32, as measured from the bottom side of each row, such as the bottom side 14c of the Halves row 14 to the top side, such as the top side 14d of the Halves row 14d, are also the same.

Vertical dots, vertical dashes, vertical lines, other such indicators may optionally be provided on the template 12 to connect slots defining equivalent fractions. For example, as shown in FIG. 1, a vertical dotted line 66 extends through the one-half (½) slot 34, two-quarters (2/4) slot 52, three-sixths (3/6) slot, four-eighths (4/8) slot, five-tenths (5/10) slot, and the sixth-twelfths (6/12) slot. Similarly, a vertical line of dots 68 is provided through the one-third (⅓) slot 40 and the slots of fractions equivalent to one third including the two-sixths (2/6) slot, the three-ninths (3/9) slot, and the four-twelfths (4/12) slot. Vertical lines of dots may also connect the slots in different rows defining other equivalent fractions which are not numbered for case of illustration. The indicators 66, 68, etc. can assist the student in quickly identifying equivalent fractions and confirming their calculation of sums and differences between fractions, for example, as discussed below. Alternatively, indicators 66, 68 and other indicators may be provided on a separate template (not shown), for example. The equivalency of respective equivalent fractions can also identified by a student by aligning a straight edge, such as a ruler or an edge of a piece of paper, for example, with the slot defining equivalent fractions. The straight edge or ruler can optionally have the same length as the rows 14-32.

A scale (not shown) having the same length as the rows 14-32 could be provided along an edge of the template 10, for example. The scale could define 100 equally spaced lines to indicate one hundredths of the length, which could be used to help a student understand decimals.

The template 10 may also include a horizontally elongated or extending slot 70 through the sheet 12. The horizontally elongated slot 70 includes a left side 70a, a right side 70b, a bottom side 70c, and a top side 70d. As described in more detail below, the horizontally extending slot 70 is used by a user, such as a student, to draw a boundary, such as a rectangular box, on a piece of paper or another such surface with a writing implement, such as a pencil or pen. The drawn rectangular box, also referred to as a Unit box, has the same or about the same dimensions as each of the rows of fractions 14-32. The horizontally extending slot 70 is referred to in this example as a Unit row because the length of the horizontally extending slot is the same or about the same as the lengths of the fraction rows 14-32, which are each assigned a value of one (1). The left side 70a of the horizontally elongated slot 70, which is aligned or substantially aligned with the left side 14a of the Halves row 14 and the other fraction rows 16-32 is labelled zero "0". The right side 70b of the horizontally extending slot 70, which is aligned or substantially aligned with the left side 14a of the Halves row 14 and the other fraction rows 16-32, is labelled one "1". The Unit row has no subdivisions, as do the rows defining fractions. The Unit row 70 may also be defined by a separate template, as discussed below.

In one example, the length of the horizontally elongated slot 70, from the left side 70a to the right side 70b, and the height of the horizontally elongated slot, from the bottom side 70c to the top side 70d are the same as the lengths and heights of the fractions rows 14-32. In another example, the length of the horizontally extending slot 70, from the left side 70a to the right side 70b, is slightly longer than the lengths of the fraction rows 14. In addition, in this example, the height of the horizontally elongated slot 70, from the lower side 70c to the upper side 70d, is slightly greater than the heights of the rows 14. The additional length and height is provided in this example to accommodate a thickness of the drawn line of the Unit box so that when a fraction row 14-32 is placed over the drawn box, the right side 14a, the left side 14b, the bottom side 14c, and the top side 14d are aligned with the corresponding sides of the drawn box, as shown with respect to FIG. 2B and discussed further below.

Typical thicknesses of a drawn line used by a student may be in a range of from about 0.1 mm to about 3.0 mm, for example. Common thicknesses of lead for mechanical pencils is 0.5 mm and 0.7. The length and height of horizontal slot 70 may therefore be from 0.1 mm to 6.0 mm larger than the lengths and heights of the rows 14-32, so that the drawn Unit box has the same or about the same dimensions as the rows 14-32. In another example, the length and height of horizontal slot 70 may be from 0.2 mm to 4.0 mm larger than the lengths and heights of the rows 14-32. In another example, the length and height of horizontal slot 70 may be from 1.0 mm to 1.4 mm larger than the lengths and heights of the rows 14-32.

Figure 33:
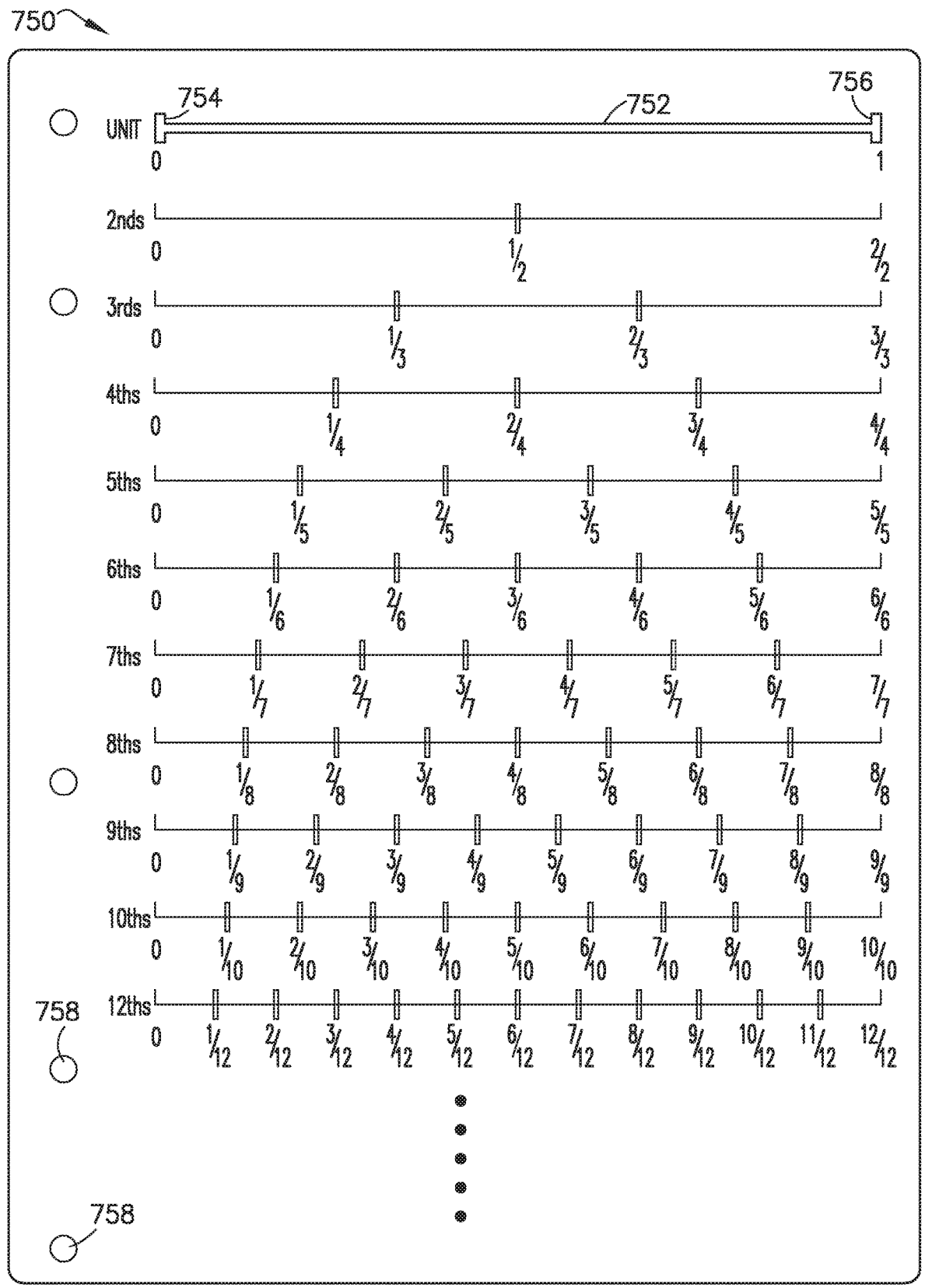
FIG. 33 is a front view of another example of a template, in which the rows of fractions are lines and the elongated slot is configured to define a line as a boundary on a surface.

In another example, discussed in more detail below with respect to FIG. 33, the elongated slot 70 has a smaller height than that shown in the FIG. 1, enabling a student to draw a boundary in the form of a line (Unit line) having the length of the rows 14-32. The rows 14-32 in this example are also lines. The slots may be the same as shown in FIG. 1, and cross or extend from the rows of lines. Mathematic operations may be performed in the same manner as described above, where the elongated slot 70 and rows 14-32 are rectangles.

In accordance with an embodiment of the invention, the template 10 of FIG. 1 may be used to visualize the equivalence of fractions having different denominators. One way this is done is through the indicators, such as the indicators 66, 68, which pass through aligned slots defining equivalent fractions, as discussed above. A student can select a fraction, such as one-half (½), and follow the respective indicator 66, 68 down the template to identify the fractions equivalent to one-half (½). A student can also select a fraction with a higher denominator, such as four-twelfths (4/12) and find equivalent fractions by following the indicator, here the indicator 74, both up and down along the aligned slots that define equivalent fractions. As noted above, the indicators are optional. Equivalent fractions can also be found by aligning a straight edge, such as a ruler or edge of a sheet of paper, for example, with an aligned fractions on the template 10. Indicators may also be provided in a separate template.

Figure 2A:
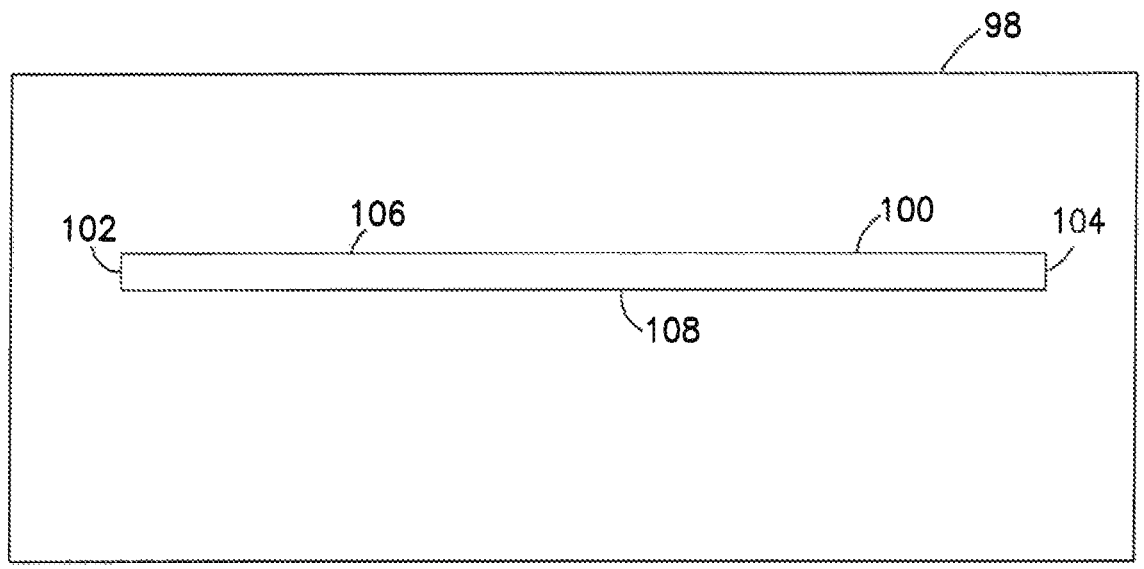
FIG. 2A is an example of a Unit box drawn on a sheet of paper with the template of FIG. 1, in accordance with an embodiment of the invention.

In another example, a student may use the template 10 to find equivalent fractions by creating an additional visual representation of the equivalence of particular fractions indicators on a surface, such as a sheet of paper 98 shown in FIG. 2A, for example. If a student or other person is investigating fractions equivalent to two-thirds (⅔), for example, the student can use the Unit row 70 of the template 10 to draw a corresponding Unit box 100 on a sheet of paper 98, by placing the template 10 over the sheet of paper 98 and tracing the inner boundary of the horizontally extending slot 70 of the template 10 on the sheet of paper. The resulting drawn Unit box 100 is shown in FIG. 2A. The drawn Unit box 100 includes a left side 102, a right side 104, a top side 106, and a bottom side 108. FIG. 2A is not drawn to scale.

FIG. 2B shows an upper left hand enlarged portion of the template 10 of FIG. 1 with a left side portion of the drawn Unit box 100 drawn within the horizontally extending slot 70, and a left side portion of the Halves row 14. FIG. 2B is not to scale. In this example, the left side 102 of the drawn Unit box 100 is shown aligned with the left side 14a of the Halves row 14. A small space "S" is also shown between the left side 102, bottom 108, and tope 106 of the drawn Unit box 100 and the left side 70a, bottom side 70b, and top side 70d of the horizontally extending slot 70 in the enlarged view. The length and height of the horizontally extending box with respect to the lengths and heights of the fraction rows 14-32 may also take into account such a space "S". A distance "D" between left side 14a of the halves row and the left side 70a of the horizontally elongated slot 70 is also shown. The distance "D" indicates the difference in alignment of the left side of the Halves row 14, and the other fraction rows 16-32, with the left side 70a of the Unit row 70 and is provided to accommodate the thickness of the pencil line or pen line used to draw the Unit box 100. This difference is provided so that the fraction rows 14-32 more closely align or overlap with the drawn Unit box 100 than if no such distance is provided. Such a distance "D" is provided on all sides of the drawn Unit box 100 and the horizontally extending slot 70. Based on the pencil line thicknesses discussed above, the distance "D" may be 0.1 mm to 3.0 mm, for example. Since the drawn Unit box 100 and the fraction rows 14-32 have about the same dimensions, the length and height of horizontally extending slot 70 are greater than the lengths and heights of the fraction rows 14-32 by about 2D, respectively. As discussed above, the length and height of horizontally extending slot 70 may be from 0.1 mm to 6.0 mm larger than the lengths and heights of the rows 14-32, from 0.2 mm to 4.0 mm larger than the lengths and heights of the rows 14-32, or from 1.0 mm to 1.4 mm larger than the lengths and heights of the rows 14-32, for example.

Figure 3:
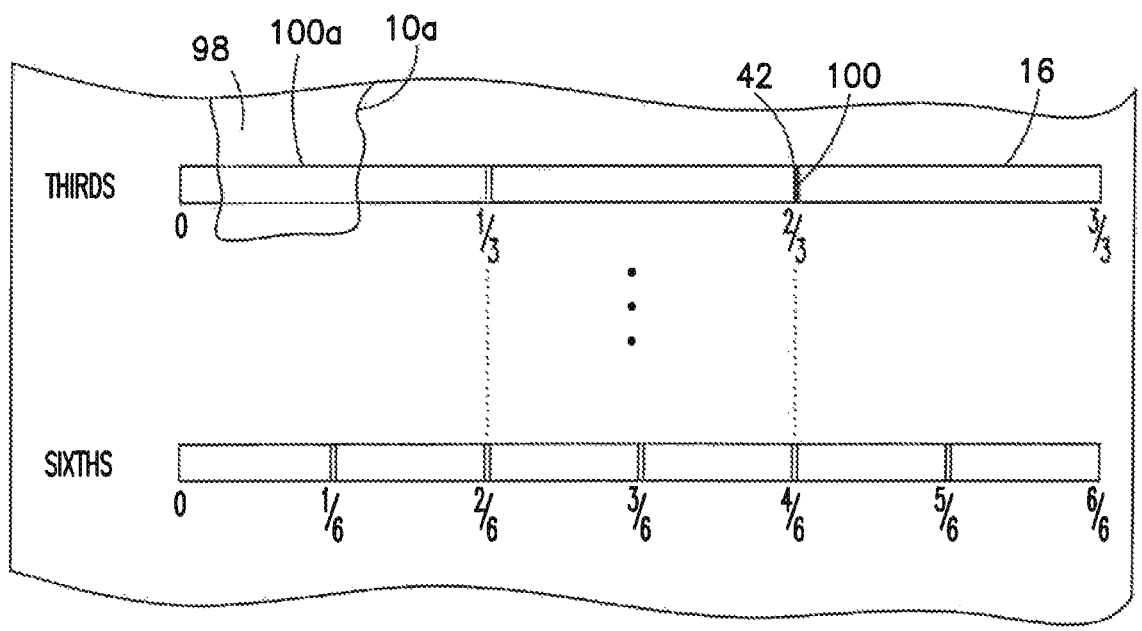
FIGS. 3-5 show steps in an example identifying equivalent fractions, in accordance with an embodiment of the invention.

Returning to the use of the template 10, in this example, the student aligns the Thirds row 16 of the template 10 with the drawn Unit box 100 by aligning the left side, right side, top, and bottom of the Thirds row 16 with the left side 102, right side 104, top 106, and bottom 108 of the of the drawn Unit box, respectively, as shown in FIG. 3. A portion 10a of the template 10 is cutout in FIG. 3 to show the paper 98 and a portion 100a of the drawn Unit box 100 under the template. Only the portion of the template 10 that includes the Thirds row 14b and the Sixths row 14e is shown for ease of illustration. In this example, the portion 100a is shown aligned with the top and bottom sides of the Thirds row 16 because the length and height of the horizontally extending slot 70 is slightly larger than the length and height of the rows 14-32. It is noted that even in the example where the length and height of the horizontally extending slot 70 is slightly larger than that of the fraction rows 14-32, the alignment between the drawn Unit box 100 and a selected fraction row 14-32 may be approximate due to variations in drawn pencil line thicknesses and manufacturing tolerances, for example. In other examples, one of the fraction rows 14-32 may be aligned with the drawn Unit box 100 may partially overlapping the drawn Unit box or concentrically surrounding drawn Unit box.

Figure 4:
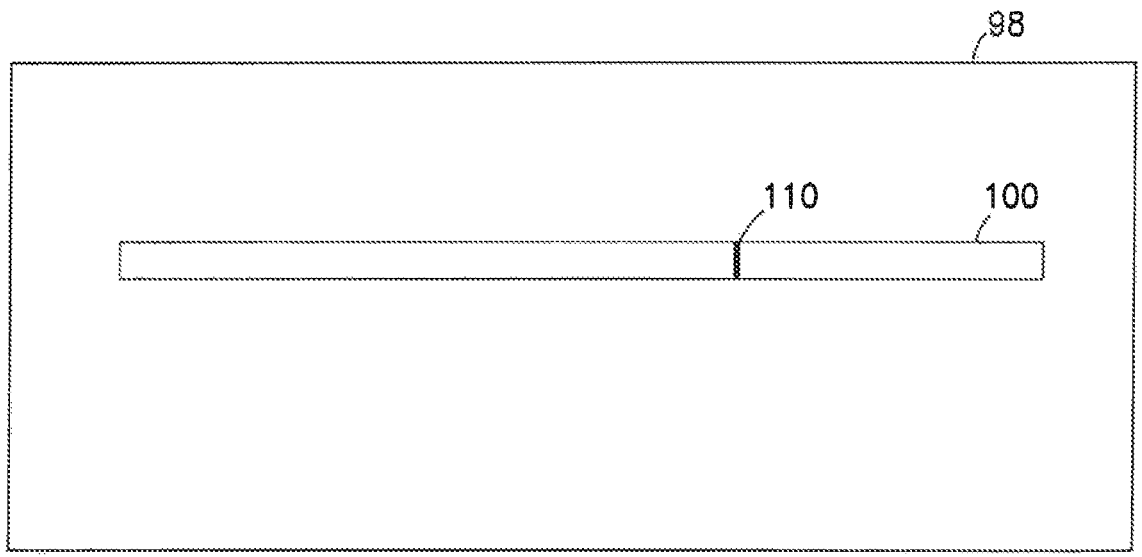

After alignment, the student draws a line 110, or other indication, via the two-thirds (⅔) slot 42 in the drawn Unit box 100, as shown in FIG. 3. The drawn line 110 is shown in the Unit box 100 after removal of the template 10 removed, in FIG. 4.

The student may then move the template 10 upwards with respect to the drawn Unit box 100, toward the top of the page 98, keeping the left sides and the right sides of the rows of fractions aligned with the left side 102 and right side 104 of the drawn Unit box 100, until another slot defining an equivalent fraction aligns with the drawn line. Alternatively, the student may move the page 98 with respect to the template.

Figure 5:
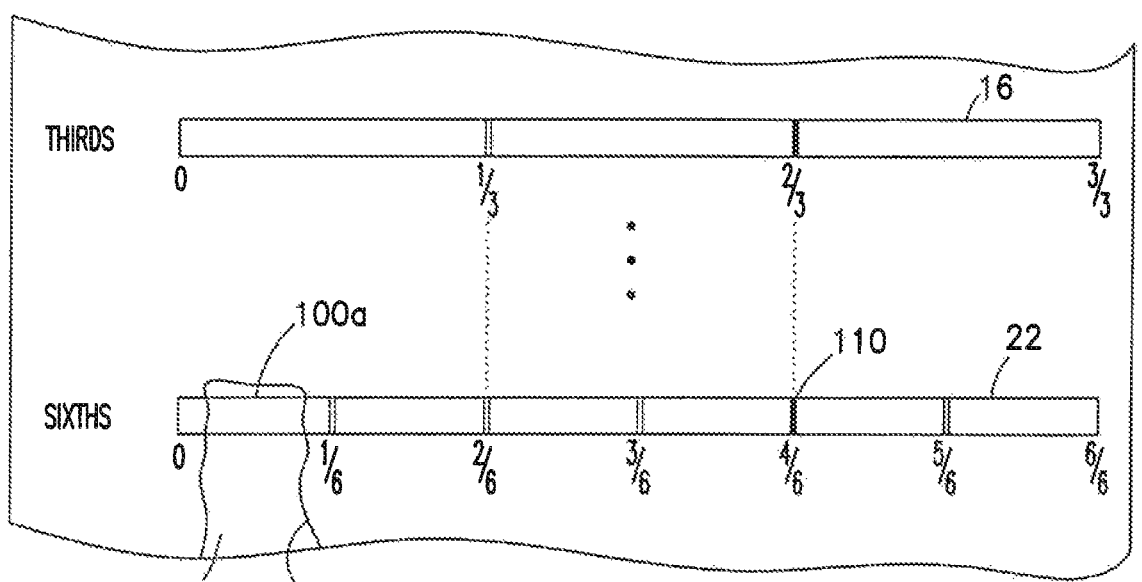

In this example, the next fraction found by the student that aligns with the drawn line 110 should be the four-sixths (⁴⁄₆) slot 67 in the Sixths row 22, as shown in FIG. 5. The student has thereby discovered that four-sixths (⁴⁄₆) is equivalent to two-thirds (⅔). The student may continue to move the template 10 up (and down) with respect to the drawn Unit box 100 and the draw line 110 to find other equivalent fractions defined by respective slots as six-ninths (⁶⁄₉) 69, eight-twelfths (⁸⁄₁₂) 71, and ten-fifteenths (¹⁰⁄₁₅) 73. It is noted that if more rows of fractions are provided on the template 10, the student may find additional equivalent fractions. The student may also draw another Unit box 100 above or below the first Unit box using the Unit row 70 to draw the equivalent fraction(s) that are found. The student can then readily see that the equivalent fractions, two-thirds (⅔), four-sixths (⁴⁄₆), six-ninths (⁶⁄₉), eight-twelfths (⁸⁄₁₂) 71, and ten-fifteenths (¹⁰⁄₁₅) have the same lengths. Use of the template 10 in this manner can provide the student with a further feel for the equivalency of fractional values and the equivalency of fractional lengths of respective fractions and equivalent fractions with the template 10.

The template 10 of embodiments of the present invention may also be used to perform mathematical calculations with the fractions on the template, such as addition and subtraction. In one example, fractions with the same or different fractions, whose sum is less than or equal to one (1), may be readily added with the template 10. To add the fraction one-third (⅓) to the fraction one-quarter (¼), for example, the student may draw the Unit box 100 with the Unit row 70 of the template, and then align the Thirds row 16 with the drawn Unit box 100, in a similar manner as discussed above with respect to FIG. 2A.

Figure 6:
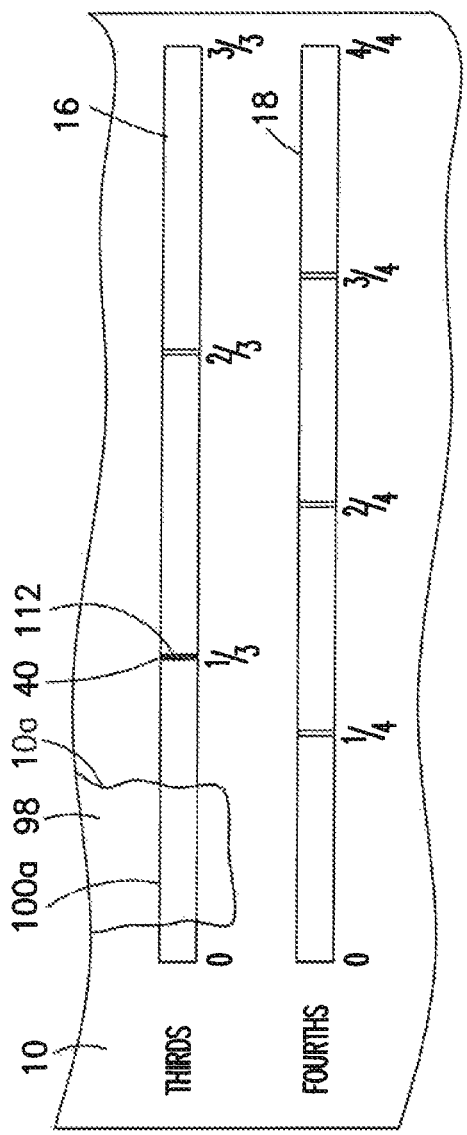
FIGS. 6-8 show steps in an example of performing addition of fractions using the template of FIG. 1, in accordance with an embodiment of the invention.

The Thirds row 16 is aligned with the drawn Unit box 100 when the respective row and the drawn Unit box completely overlap, and the left edge of the Thirds row 16, marked zero "0", is aligned with the left edge on the Unit box 100, as discussed above with respect to FIG. 3 and shown in FIG. 6. In this example, the student draws a line 112 in the slot 40 for one-third (⅓), in the drawn Unit box 100, as shown in FIG. 6. The length of one-third (⅓) from the left side of the Unit box 100, at "0", to the one-third (⅓) line 112, may be seen by the student. In FIG. 6, only the portion of the template 10 including the Thirds row 16 and the Fourths row 18 are shown.

Figure 7:
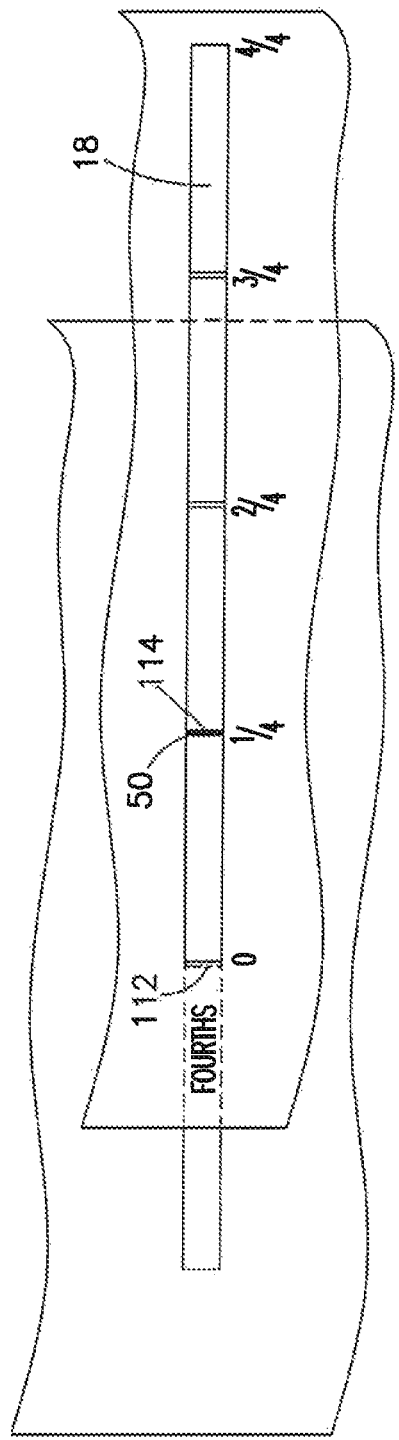
Figure 8:
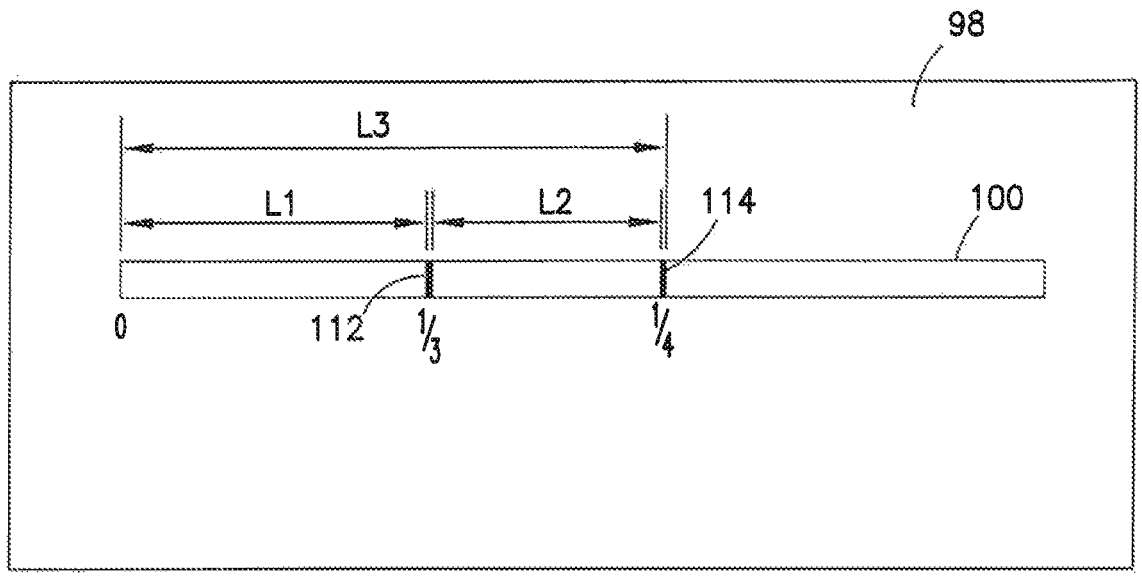

The student then moves the template 10 upward with respect to the page to align the Fourths row 18 for the second fraction in the mathematical operation, one-quarter (¼), with the drawn Unit box 100, as shown in FIG. 7, where only the Fourths row 18 of the template 10 is shown. In this case, the left side of the Fourths row 18, corresponding to zero "0", is aligned with the already drawn line 112 for the first fraction, here, one-third (⅓), in the drawn Unit box 100, to perform the addition operation. The line 114 for the second fraction, here, one-quarter (¼), is then drawn in the one-quarter (¼) slot 50 in the Unit box 100. The resulting line 114 is shown in FIG. 8, along with the first drawn line 112 in the Unit box 100. A length L1 from the zero "0" or origin of the Unit box 100 to the first line 112, which represents one-third (⅓), and a length L2 from the line 112 to the line 114, which represents one-quarter (¼) are also shown. An additional fraction could be added to the sum of one third (⅓) and one-quarter (¼) in the Unit box 100, in a similar manner.

By removing the template 10 and observing the two drawn lines 112, 114, the student can appreciate the relative lengths L1, L2 of the two fractions, respectively, and the length of the sum L3 of lengths L1 plus L2. The student may then place the template 10 over the drawn Unit box 100 so that any row of the template, such as the Halves row 14, is aligned with the drawn Unit box 100. The template 10 is then moved upwards with respect to the paper 98 until a slot aligns with the second drawn line 114. In this example, the student will find that the slot 75 for seven-twelfths (7/12) aligns with the drawn line 112. The student has now discovered that one-third (1/3) plus one-quarter (1/4) equals seven-twelfths (7/12).

In addition, through the use of the template 10, the student may discover through the use of the template 10 that seven-twelfths (7/12) is the sum of four-twelfths (4/12), which is equivalent to one-third (1/3), the first fraction in the operation, and three-twelfths (3/12), which is equivalent to one-quarter (1/4), which is the second fraction in the operation. After finding the equivalent fractions in terms of the common denominator "12", the student can see the numerators, "4" and "3" may be added to yield "7", resulting in the same fraction, seven-twelfths (7/12), as was previously discovered by direct addition.

Figure 9:
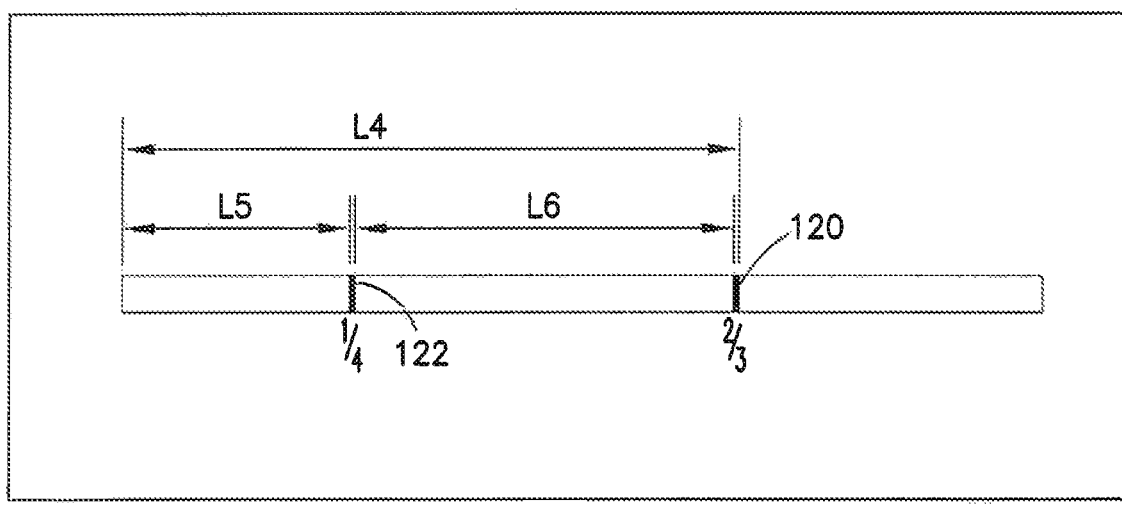
FIG. 9 is an example of a Unit box with lines drawn to perform a subtraction operation.

Subtraction may also be performed with the template 10 in accordance with an embodiment of the invention. In one example shown in FIG. 9, to subtract one-quarter (1/4) from two-thirds (2/3), a line 120 is drawn in the Unit box 100 to indicate the length L4 of two-thirds (2/3), in the same manner shown and described above with respect to FIG. 3. The template 10 is then moved to align the Quarters row 16 with the Unit box 100, and a line 122 is drawn in the one-quarter (1/4) slot 34 of the template 10 to indicate a length L5 of one-quarter (1/4), as shown in FIG. 9. It is apparent that a length L6 is equal to the difference between L4 and L5 (L4−L5), or two-thirds (2/3) minus one-quarter (1/4).

To determine a fractional value of the length L6, in this example the student may then place the template 10 over the drawn Unit box 100 in FIG. 9 so that a left-side of one of the rows, such as the Halves row 14, is aligned with the line 122 in the Unit box. The template 10 is then moved upwards with respect to the Unit box 98 until a slot aligns with the drawn line 120. It is noted that if the Fifteenths row 32 is first aligned with the line 122, the template 10 would be moved down with respect to the Unit box 100. In this example, the student will find that line 120 is aligned with the slot for five-twelfths (5/12). As discussed above, the length L6 from the line 132 to the line 130 is the length of the difference between L4 and L5 (L4−L5), which is equal to two-thirds (1/3) minus one-quarter (1/4) (2/3−1/4). The student now knows that two-thirds (1/3) minus one-quarter (1/4) is equal to five-twelfths (5/12). As above, the student can also see that the eight-twelfths (8/12) is equivalent to two-thirds (2/3), three-twelfths (3/12) is equal to one-quarter (1/4), and, one the common denominator is identified, the subtraction operation may be performed by subtracting 3 from 8 to yield 5 or five-twelfths (5/12).

Subtraction could be performed in other ways with the template 10. For example, slots may be provided on the left side of the rows 14-32 of the template, at zero (0). Then, after drawing the line 130 for two-thirds (2/3), a second line (not shown) could be drawn by aligning the slot 50 for one-quarter (1/4) with the line 120. Then the second line would be drawn at the left side of the Fourths row 18 at zero (0). The distance from the left side 102 of the drawn Unit box 100 to the second line also represents the difference between the two fractions, here two-thirds (2/3) and one-quarter (1/4). A fraction equivalent to the difference may then be found in the manner described above, by aligning the lefts sides of one or more of the rows 14-32 with the left side 102 of the drawn Unit box 100 and finding a slot that aligns with the second line.

The template 10 could also be rotated 180 degrees around a point perpendicular to the plane of the page, to use the template in the manner described above by rotating the template by 180 degrees to subtract the second fraction from the first fraction. In this example, the side of the marked zero "0" is placed at the line 120. A line is drawn in the slot 34 indicative of one-quarter (1/4). The distance from the left side of the drawn unit box 100 to the drawn line is equal to the difference between the fractions. The value of the difference may then be found by returning the template 10 to its original orientation. It is then found that the slot 76 for five-twelfths (5/12) aligns with the line 120.

The student can thereby add and subtract fractions without having to find a common denominator, and then discover the equivalent operation with common denominator, which may be too complicated for the student to perform directly at the time. As the student progresses, the template 10 may be used in conjunction with finding a common denominator to check their work and to enhance their understanding. For example, when the student moves on to adding and subtracting fractions by finding common denominators, the template 10 may further assist the student in finding the common denominator, checking the found common denominator, and checking the result of the calculation. In addition, by performing the operation in different ways, the student may gain further confidence in dealing with fractions.

Other measuring indicators, such as a scale (not shown) may be provided an edge of the template 10, for example. The length of the scale may be the same as the lengths of the rows 14-32 and substantially the same as the length of the unit box 70 to allow the student to measure the lengths of individual fractions drawn on a piece of paper, as well as the lengths of sums and differences, for example.

Figure 10:
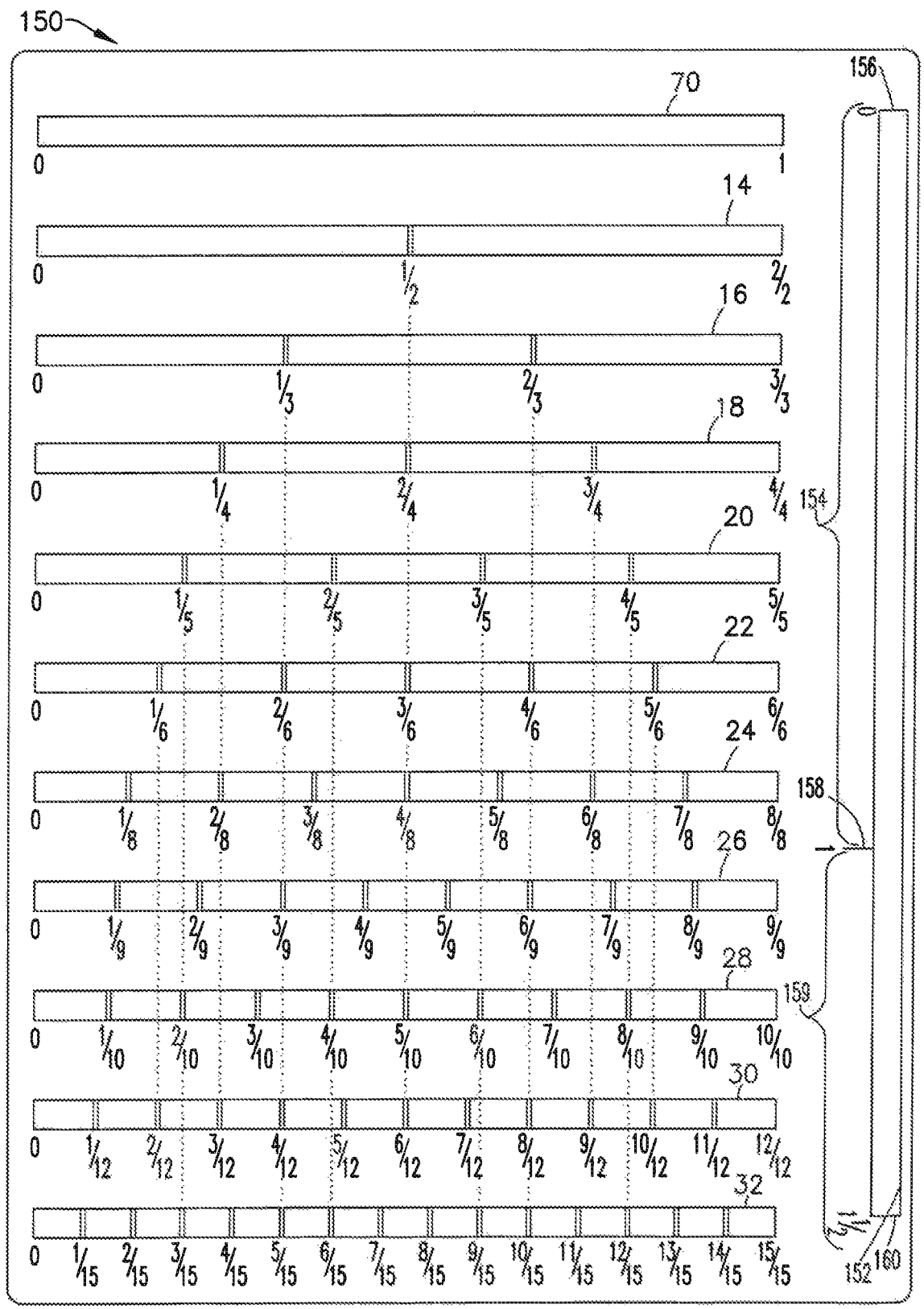
FIG. 10 is an example of a template that can be used to add fractions whose sum is up to 1.5, in accordance with an embodiment of the invention.

FIG. 10 is an example of a template 150 that can be used to add fractions whose sum is up to 1.5. Features common to template 10 are similarly numbered. The difference between template 10 and template 150 is that a second elongated slot 152 is provided with a length 1.5 times the length of the first horizontally extending slot 70 and the fraction rows 14-32. The second elongated slot 152 extends vertically in FIG. 10. The second elongated slot 152 has a first section 154 from the top edge 156, which is also marked zero "0" to a marker 158. The first section 154 has a length equal to the length of the first horizontally extending slot 70. The location of the marker 158 in this example is indicated by the numeral "1" on the template, which corresponds to the length of the unit box 70, the left side of which may also include the indicator "1". A second section 159 of the second elongated slot 152 has a length from the marker 158 to the bottom edge 160 of the second elongated slot 152 that is equal to half the length of the first section 154 and half the length of the horizontally extending slot 70. The bottom edge 160 in this example includes the indicator "1½". To make room for the additional elongated slot 152 in the template 150, the lengths of the rows" 14-32 and the length of the horizontally extending slot 70 may be decreased. The fraction identifiers (Halves, Thirds, Quarters, etc.) are also not included in this example. Alternatively, the template 150 could be made wider, for example.

As discussed above with respect to the horizontally extending slot 70 of FIG. 1, the dimensions of the second elongated slot 152 are such that a box drawn with the second elongated slot will have the same or about the same height as the heights of the fraction rows 14-32, and a length equal to or about 1.5 times the lengths of the fraction rows.

If a sum is found to be or is expected to be greater than one (1), then the second elongated slot 152 is used to determine the sum by drawing a box with the second elongated slot 152. It is noted that when the second row 140 is used, the template 150 may be rotated 90 degrees so that the second row 152 extends horizontally. The box is drawn using the second row 150, in the same manner the Unit box 100 is drawn. The demarcation between the first section 142 and the second section 146 is indicated in the drawn box by marking the location of the marker 158 in the drawn Unit box 100. If the line indicating the sum of the fractions, determined as described above, extends beyond the demarcation, then it is known that the sum is greater than one (1). The student can discover how much greater than one (1) by aligning the left side of a row 14-32 of the template 150 with the drawn demarcation and finding the fraction that aligns with the drawn line indicating the sum. If the drawn line aligns with the slot 50, for example, then it is found that the portion of the sum that is greater than one (1) is one-quarter (¼). It is then learned that the sum of the fraction is 1¼. The second row can also be used when adding fractions whose sum is less than or equal to one (1).

Alternatively, the template 150 can be oriented in landscape, with the row 152 extending horizontally at the top of the template 150, for example. In this example, the fraction rows 14-32 could be made longer to accommodate more slots to define fractions up to 1.5 and a sum could be found directly by alignment, as discussed above with respect to FIGS. 6-8. Fewer rows of fractions or a larger template to accommodate more rows of fractions may then be provided. In this example, the first horizontally extending Unit row 70 need not be provided, because the second elongated slot 152 could be used for all operations.

Figure 11:
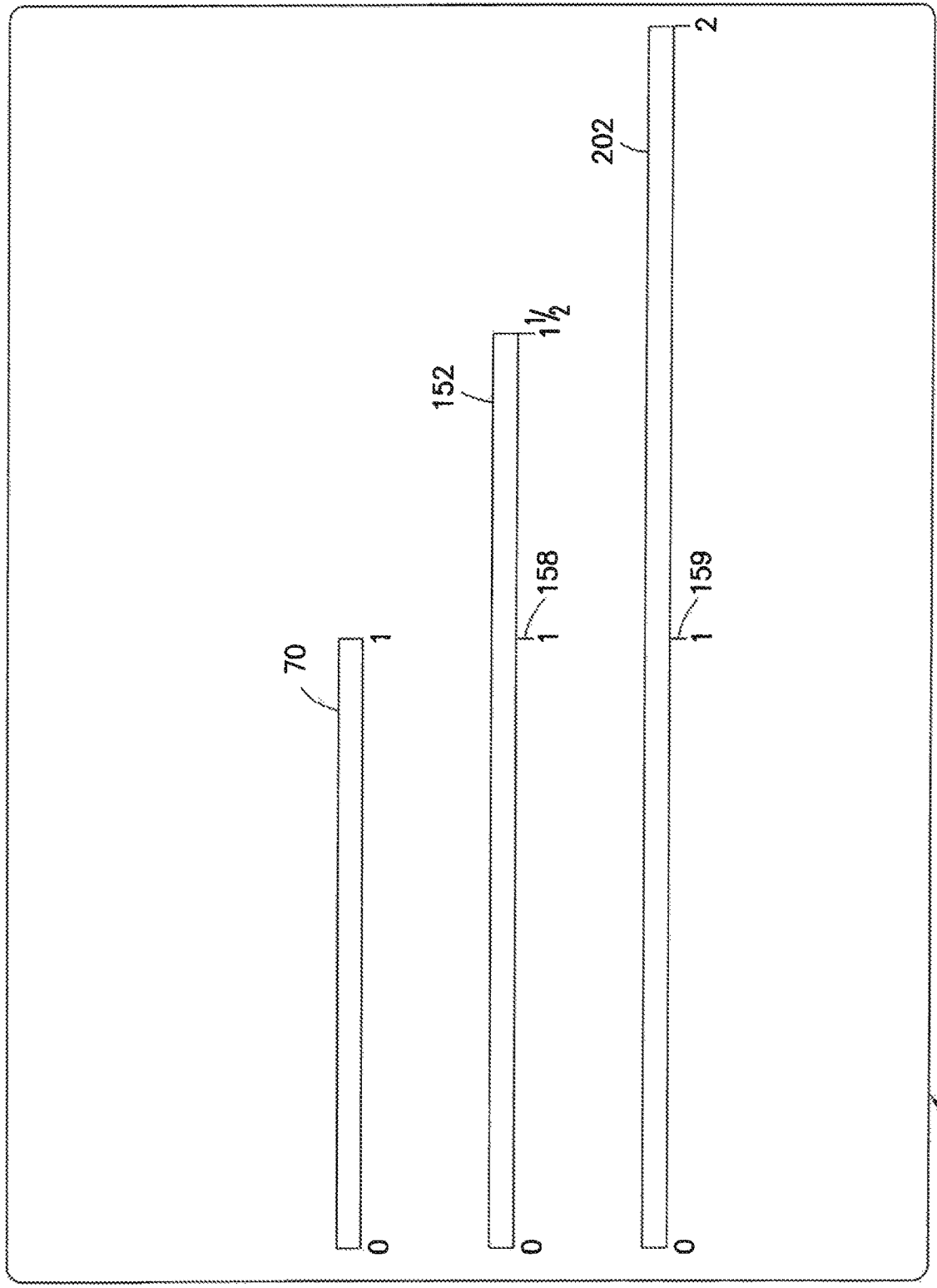
FIG. 11 is an example of a second template that may be provided to include one or more elongated slots, including a Unit row, a second elongated slot 1.5 times the length of the Unit row, and/or a third elongated slot that is 2 times the length of the Unit row.

As above, the second elongated slot 152 may be provided on a separate, second template. FIG. 11 is an example of a second template 200 that may be provided to include one or more elongated slots, including the Unit row 70, and/or the second elongated slot 152, which is 1.5 times the length of the Unit row, as discussed above with respect to FIG. 10. A third elongated slot 202 may also be provided on the separate template 200 that is equal to two (2) times the length of the Unit row 70, as shown in FIG. 11. A marker 159 and an indication of "1" that aligns with the length of the elongated slot 70, and the marker 158 is also included in this example. A numeral "2" is provided at the left side of the elongated slot 202, which indicates that the elongated slot 202 is two (2) times the length of the Unit row 70. The template 200 may be the same size or a different size from the other templates 10, 150 described above. The template 200 is oriented in landscape. If the elongated slots 70, 152 are provided on the separate template 200, it need not be provided on the templates 10 and 150, respectively, although that is also an option. Other indicators may be provided on the template 150, such as one or more scales, for example, as discussed above. The templates 10 and 200, and 150 and 200 may be packaged together and sold as a set.

A guide or frame may be provided to support one or more sheets of paper and to support movement of any of the templates 10, 150 with respect to a sheet of paper 98 or movement of the sheet of paper with respect to the template, to facilitate alignment of respective fraction rows for example, with a Unit box 100 drawn on the sheet of paper.

Figure 12:
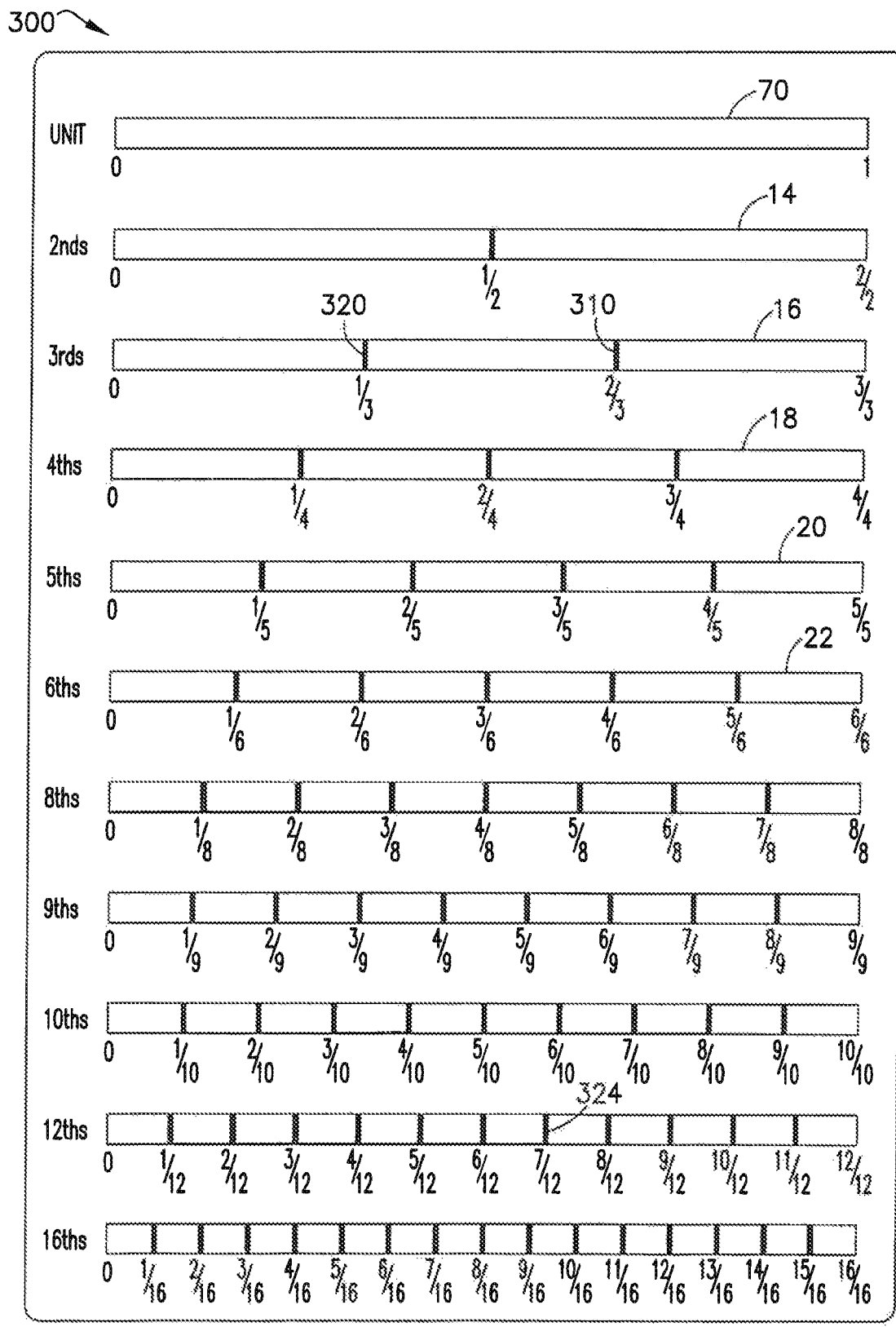
FIG. 12 is an example of a first equivalent fraction template ("first template") for use in another embodiment of the invention, where fractions are indicated by marks on first template.

FIG. 12 is an example of a first equivalent fraction template 300 ("first template 300") in accordance with another embodiment of the invention. Components common to the first template 10 are commonly numbered in FIG. 12. In this embodiment, the first template 300 is similar to the template 10, except that the template does not include the one or more slots in each row to define respective fractions and the horizontally extending slot 70 shown in FIG. 1, for example. Instead of using the slots to define respective fractions, as in the template 10, the template 300 uses markers or demarcations printed on, laminated on, or embedded into the first template 300 to define respective fractions. The markers may be solid rectangles, solid lines, or other shapes. Solid rectangles are as shown in FIG. 12.

The first template 300 is formed of a sheet or plate 12 of plastic. The plastic sheet or plate may be a rigid or semi-rigid plastic, for example. In this example, the template 300 is opaque, although that is not required. Since slots are not defined through the sheet 12, the rows defining respective fractions may be the narrower because it is not necessary to draw lines in the slots, as in the embodiments described above. More fraction rows may therefore be provided on the template 300. The first template 300 in this example includes rows corresponding to the fractions Seconds (2nds), Thirds (3rds), Quarters (4ths), Fifths (5ths), Sixths (6ths), Eighths (8ths), Ninths (9ths), Tenths (10ths), Twelfths (12ths), and Sixteenths (16ths). In this example, the Sixteenths (16ths) row is provided instead of Fifteenths (15ths) rows. A Fifteenths (15ths) row may be provided instead of the Sixteenths (16ths) row, or in addition to the Sixteenths (16ths) row if a larger template 300 is used. As above, in this example, rows for sevenths, elevenths, thirteenths, and fourteenths are not provided so that other, more commonly used fractions can fit in the desired size template 12. If the first template 300 is longer, these or other fractions could be included. Alternatively, if one or more other fraction rows are not included, then one or more of the omitted fractions could be included instead.

The fraction rows in this example are identified by partial numerical values, such as (2nds), (3rds), etc., instead of by fraction names, such as Halves, Thirds, etc., as in the template 10 of FIG. 1, to save room on the template 300. The fraction rows may be identified by name in this embodiment, as in the template 10, or fraction names could be used in this embodiment, as in the template 10 of FIG. 1. Each fraction row includes left sides, right sides, top sides, and bottom sides, as in the template 10 of FIG. 1. In one example, the width of the first template 300 is eight one-half (8½ inches), for example. Each fraction row and the Unit box may have lengths of five (5) to eight (8) inches, for example. The sides are not individually identified in FIG. 1 for ease of illustration. Vertical dots, vertical dashes, vertical lines, other such indicators (not shown) may optionally be provided on the template 300 to connect slots defining equivalent fractions, as in the template 10 of FIG. 1. Other features of the templates 10, 150 not shown on the first template 300 may also be provided.

Figure 13:
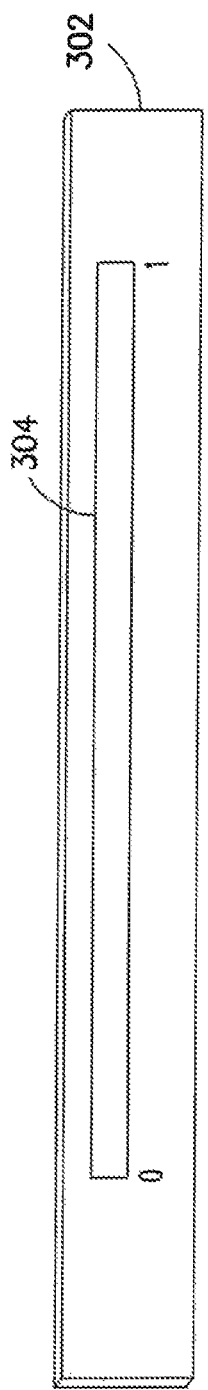
FIG. 13 is an example of a second template for use with the first template of FIG. 12.
Figure 14:
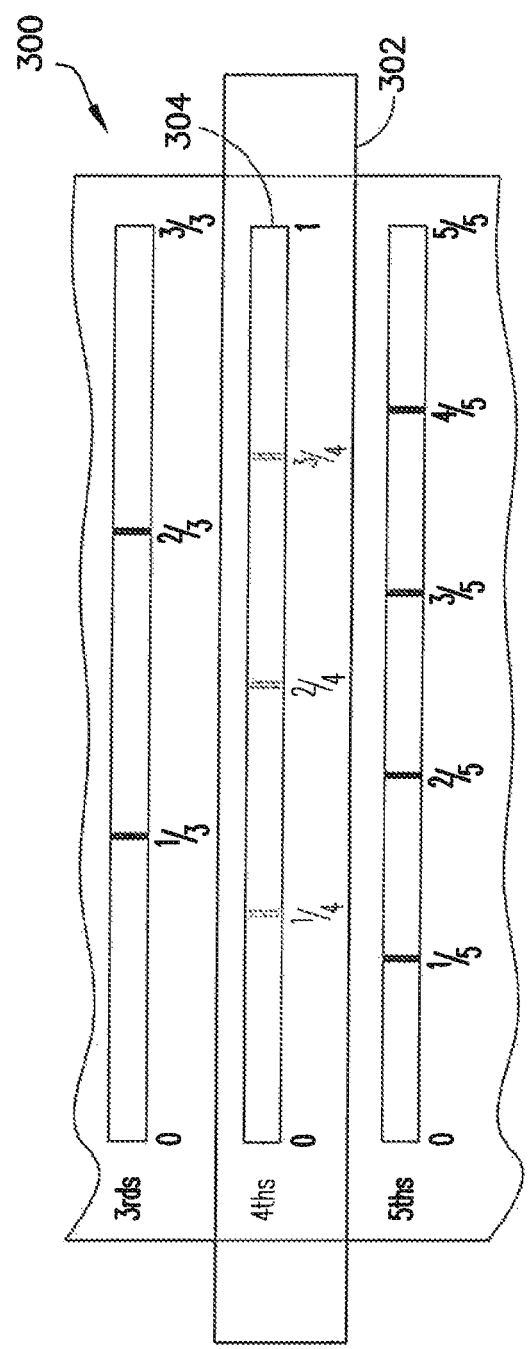
FIGS. 14-16 show steps in an example of the use of the first template and the second template of FIGS. 12 and 13, respectively, to identify equivalent fractions in accordance with this embodiment.

A second template 302 comprising a plate of transparent plastic, such as a rigid or semi-rigid plastic, for example, is used in conjunction with the first template 300. An example of a second template 302 in accordance with this embodiment is shown in FIG. 13. A boundary or Unit box 304 is defined on a second template 302. The Unit box 304 has a left side, a right side, a top side, and a bottom side having the same dimensions as each of the fraction rows on the first template 300. The left side has an indication of zero (0) and the right side has an indication of one (1). The second template 302 may be the same size as the template 300 or may have a smaller height than the size of the template 300. In the example of FIG. 13, the height of the second template 304 is slightly larger than the height of an individual fraction row and slightly larger than the height of the unit box 304. The width of the template 302 may be greater than the width of the fraction rows, and may be greater than the width of the first template 300, as shown in FIG. 14, for example. In other examples, the second template 302 may have the same width or a smaller width than the first template 300. The first template 302 and the second template 304 may be packaged together in a set.

In one example, where the width of the first template 300 is eight one-half (8½) inches, the height is eleven (11) inches, and the width of each fraction row is eight (8) inches, the width of the second template 302 may be nine (9) inches, the length of the Unit box 304 is eight (8) inches and the height of the second template 302 may be three (3) inches, for example.

As above, the fraction rows of the first template and the boundary 304 on the second template 304 may be a line, or a Unit line, and the marks on the first template 300 may cross the fraction lines. Marks may be drawn on the second template 302 in the same manner as described above, crossing the line on the second template. Mathematical operations may be performed in the same manner as described above with respect to the first template 300 of FIG. 12 of the second template 302 of FIG. 13.

Instead of drawing a Unit box on a sheet of paper and drawing lines indicative of fractions within the drawn Unit box, as in the embodiments above, in this embodiment, fractional values are drawn on the second template 302, within the Unit box 304. A marker or pen, such as a dry erase or a wet erase marker, may be used. In one example, the marker is an erasable marker, so that the second template 302 is reusable. Suitable erasable markers and pens are available from Pilot, Tokyo, Japan, and Société BIC S.A., Clichy, France, for example. When the student is finished identifying the equivalent fractions, the drawn line on the second template 302 may be wiped off. If the erasable marker is a wet erase marker, the second template 302 may be wiped off with a damp cloth or tissue, for example. If the marker is a dry erase marker, then the second template 302 can be cleaned with an eraser or cloth.

Figure 15:
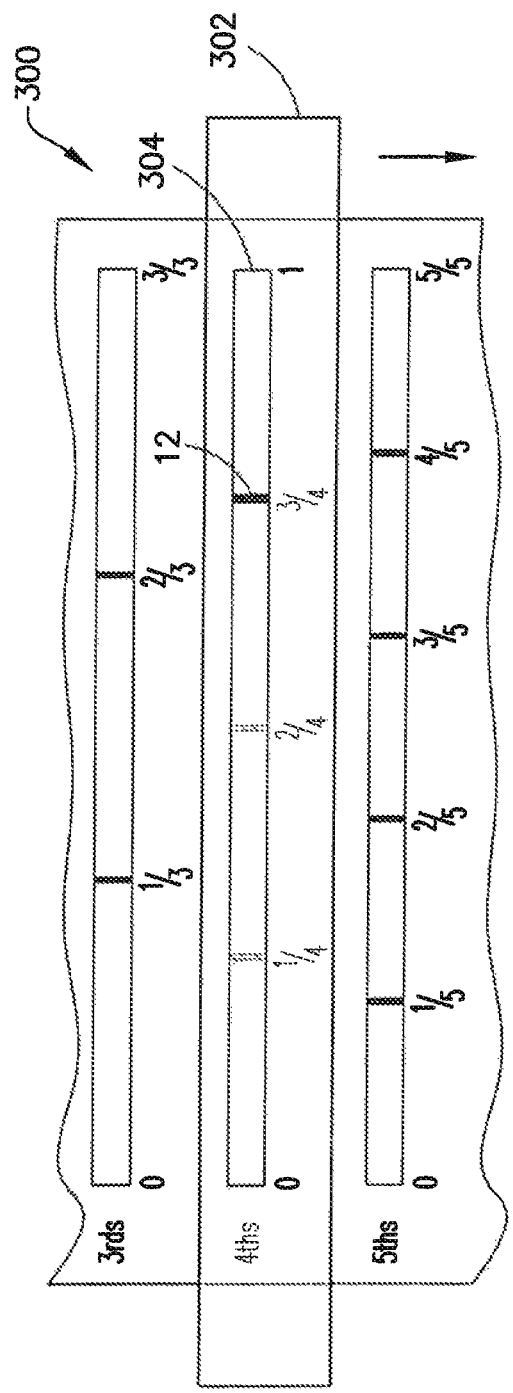

The first and second templates 300, 302 may be used to portion mathematical operations, such as identifying equivalent fractions, in a manner similar to that described above. A fraction is selected, such as three-quarters (¾). To identify fractions equivalent to three-quarters (¾), for example, the Unit box 304 of the second template 302 is placed over the first template 300 so that the fraction rows and Unit box 70 on the first template are visible through the transparent second template. The Unit Box 304 is aligned with the Quarters row 16, as shown in FIG. 14. Here and in other examples, the marks on the fraction row for Fourths (4ths) are in cross-hatching to indicate that they are under the second template. The mark 310 on the template 300 identifying three-quarters (¾), which can be seen through the second template 302, is located. A mark 312 is drawn on the template 302 with the erasable marker, over the marker 310, as shown in FIG. 15.

Figure 16:
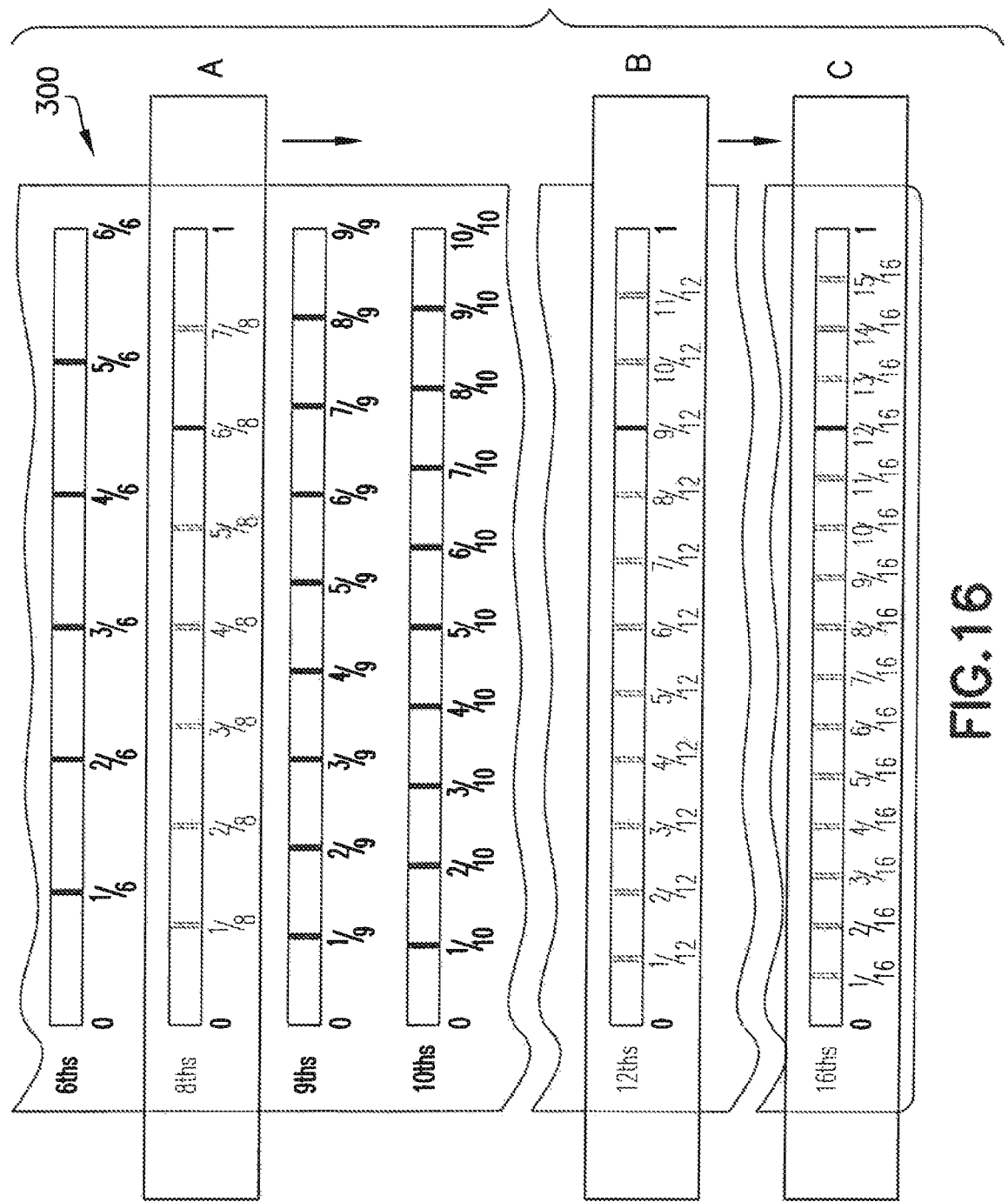

The second template 302 is then moved down (or up) with respect to the rows of fractions of the template 300 until the drawn mark 312 aligns with another marker on the template 300, as shown in FIG. 16. At a position A, the mark 312 identifying three-quarters (¾) aligns with and is therefore found to be equivalent to six-eighths (⁶⁄₈). The second template 302 may be moved further down the rows of fractions of the template 300 to also find that the mark 312 identifying three-quarters (¾) also aligns with and is therefore equivalent to nine-twelfths (⁹⁄₁₂), in position B, and to twelve-sixteenths (¹²⁄₁₆), in position C. In a larger template, additional equivalent fractions, such as fifteen-twentieths (¹⁵⁄₂₀), may be identified, for example.

Other mathematical operations, such as addition of fractions, may also be performed with the template 300 and the template 302. FIGS. 17-22 illustrate the use of the first template 300 and the second template 302 in performing the mathematical operation of adding one-third plus one-quarter (⅓+¼). Mathematical operations may also be performed on fractions having the same denominators in a similar manner in this and other embodiments described herein.

Figure 17:
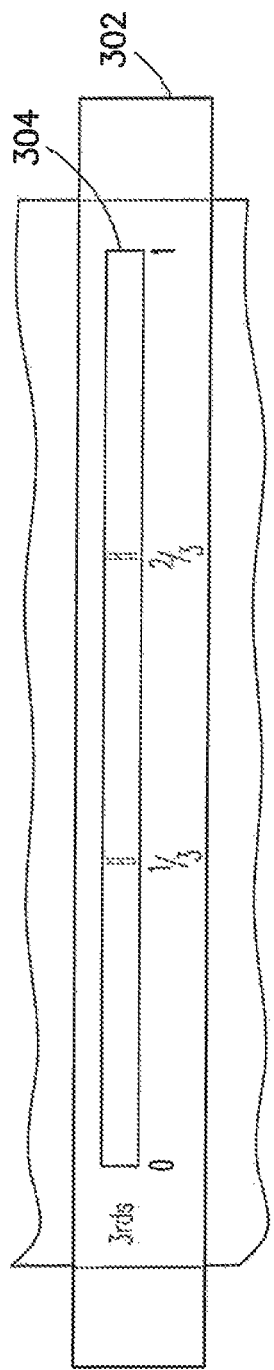
Figure 18:
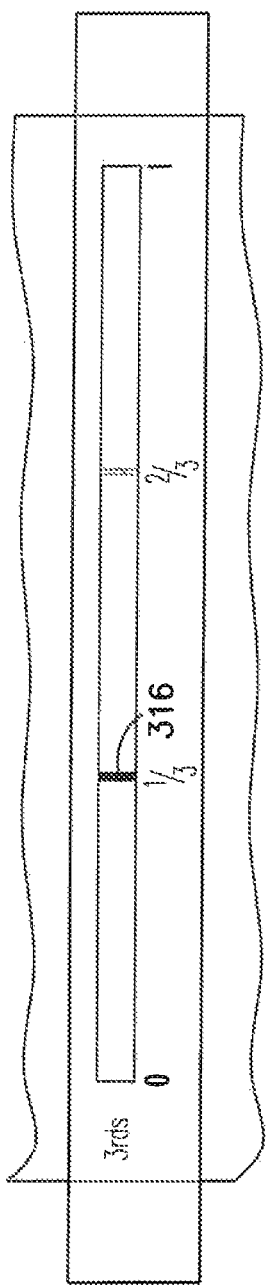

The Unit box 304 of the second template 302 is first placed over and aligned with the Thirds (3rds) row 16 of the template 300, as shown in FIG. 17. The one-third (⅓) marker 314 on the template 300 is identified, as shown in FIG. 17, and a line 316 is drawn on the template 302 over the one-third (⅓) marker, as shown in FIG. 18.

Figure 19:
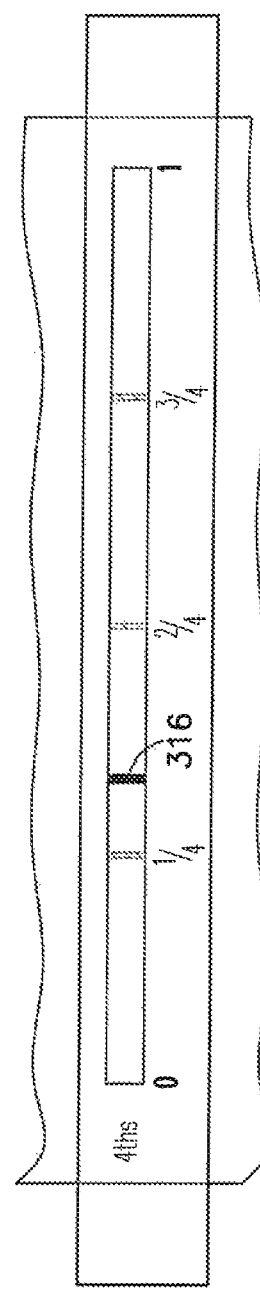

Then the Unit box 304 of the second template 302, with the drawn one-third (⅓) line 316, is aligned with the fourths (4ths) row 18, as shown in FIG. 19. The one-quarter (¼) mark 320 is also shown in FIG. 19. The drawn line 316 on the template 302 representing one-third (⅓) is then moved to the left to align the mark 316 with the left end ("0") of the Fourths (4ths), as shown in FIG. 20.

A second mark or line 322 is then drawn over the mark 320 or for one-quarter (¼) with the erasable pen. The second mark 322 is indicative of a fraction equivalent to the sum of one-third plus one-quarter (⅓+¼).

To determine the value of the sum of one-third plus one-quarter (⅓+¼), the Unit box 304 is aligned with the unit row 70 or a fraction row on the template 300. The second template 302 is then moved with respect to the first template 300 to find a fraction that aligns with the second drawn line 322 on the second template 302. A fraction line on the template 300 that aligns with the second line 322 on the second template is equivalent to the sum of one-third plus one-quarter (⅓+¼), as discussed above. As shown in FIG. 22, the second line 322 aligns with the mark 324 for the fraction seven-twelfths (⁷⁄₁₂), which is the sum of one-third plus one-quarter (⅓+¼). A student may also determine that fractions equivalent to one-third (⅓), such as two-sixths (²⁄₆), three-ninths (³⁄₉), and four-twelfths (⁴⁄₁₂), plus fractions equivalent to one-quarter (¼), such as two-eighths (²⁄₈), three-twelfths (³⁄₁₂), and four-sixteenths (⁴⁄₁₆), are also equal to seven-twelfths (⁷⁄₁₂).

The first and second lines 314, 320 drawn on the template 302 may then be wiped off and another mathematical operation may be performed, with the same template 302. It will be apparent to one of ordinary skill in the art, in light of the discussion of addition with the first template 300 and the second template 302 in conjunction with the description of subtraction with respect to the template 10, above, that subtraction may be similarly performed with the first and second templates 300, 302.

In other examples, since the template is opaque, rows of fractions may be printed onto the rear side of the template 300. The template 300 may also be foldable. In another example, the rows of fractions on the template may be arranged in landscape. Long rows of fractions may then be provided, and fraction rows having values greater than one (1), for example. A second template for determining the result of addition operations resulting in values greater than one (1) is described below.

Figure 23:
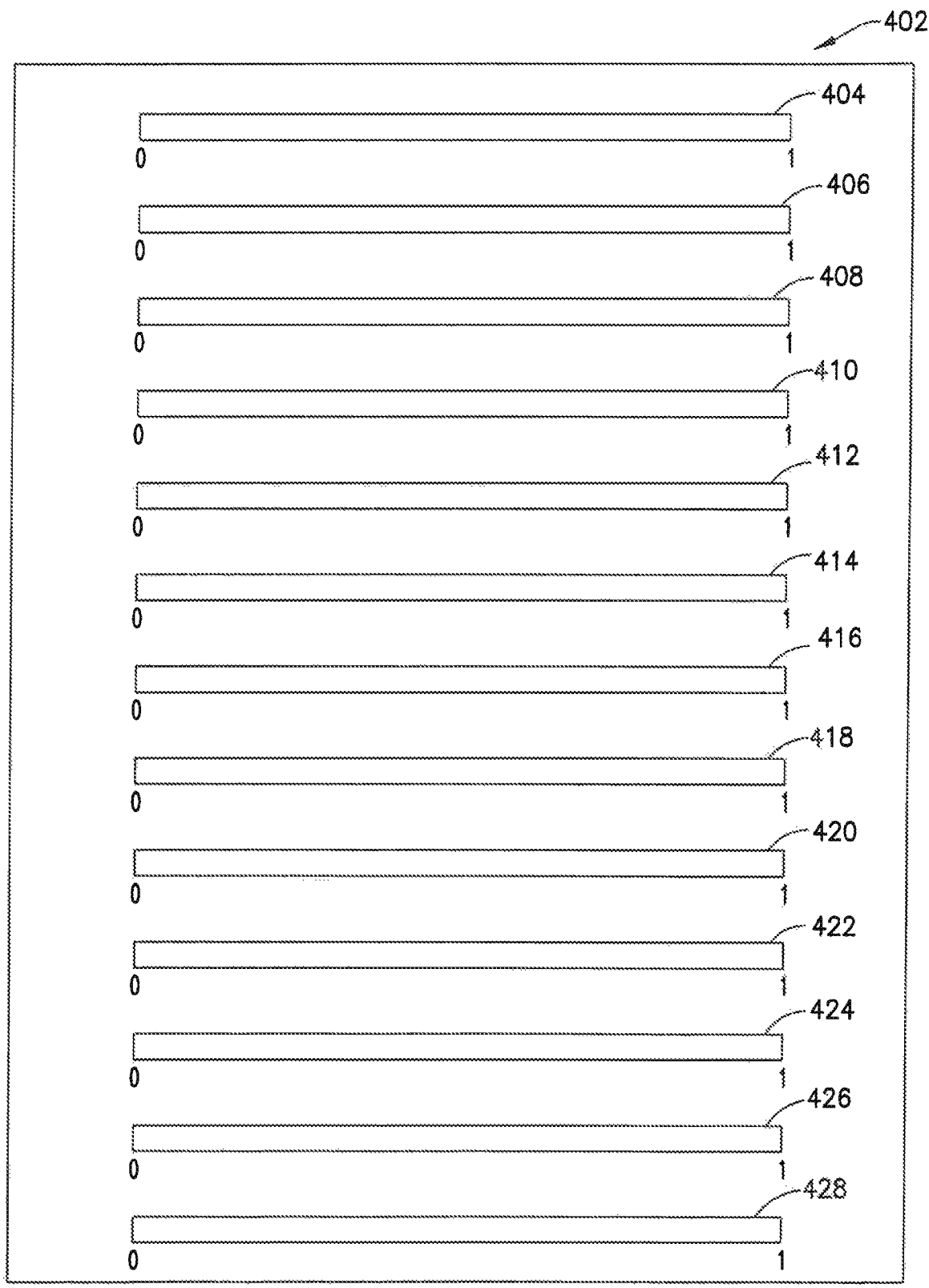
FIG. 23 is an example of a second template including thirteen (13) Unit boxes.

In another example, the second template 302 is tall enough to accommodate two or more Unit boxes 304. FIG. 23 is an example of a second template 402 including thirteen (13) Unit boxes 404-428. The Unit boxes 404-428 have the same dimensions as the fraction rows in FIG. 12. Providing multiple Unit boxes 404-428 on the same second template 402 enables a student to perform multiple mathematical operations, such as identifying multiple equivalent fractions and performing multiple mathematical operations before erasing their results.

Figure 24:
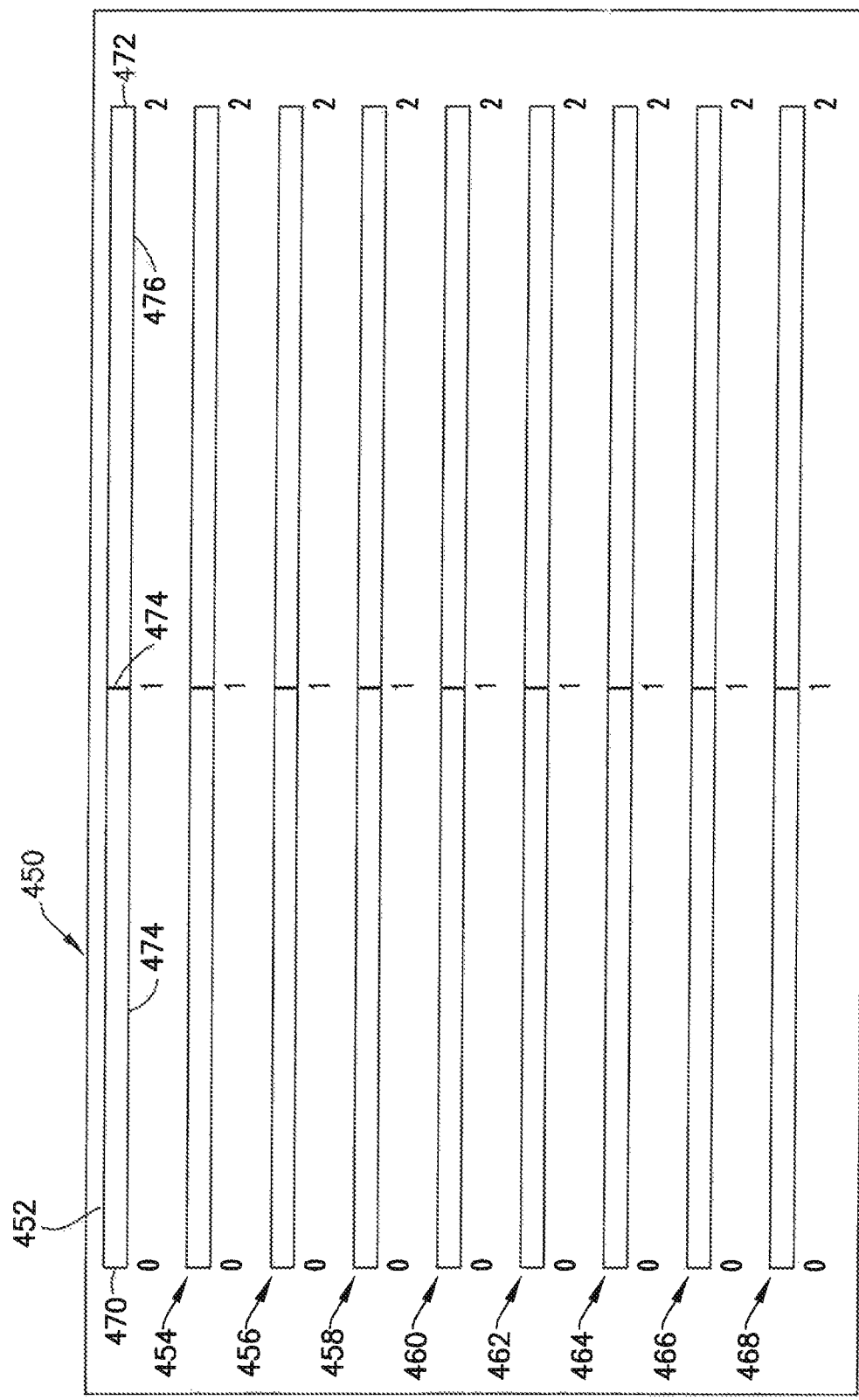
FIG. 24 is an example a second template including nine (9) two-Unit boxes for use in performing mathematical operations, such as addition, in accordance with an embodiment of the invention.

FIG. 24 is an example a second template 450 including nine (9) two-Unit boxes 452, 454, 456, 458, 460, 462, 464, 466, 468 for use in performing mathematical operations, such as addition, in accordance with an embodiment of the invention. More or fewer two-unit boxes may be provided on the second template 450. For example, one (1) two-Unit box may be provided on the second template 450. In this embodiment the two-unit boxes are arranged on the second template in a landscape orientation. If a sum is found to be or is expected to be greater than one (1), then the two-unit box 452 may be used to determine the sum by in a similar manner as discussed above.

The two-Unit box 452, for example, has a left side 470 with a zero (0) indication, a right side 472 with an indication of two (2) for two units, and a demarcation 474 between the left side and the right side. The demarcation 474 divides the two-unit box 452 into a first section 474 equivalent to one (1) unit and a second section 476 equivalent to one (1) unit. The demarcation has an indication of one (1).

If the second line drawn on the second two-Unit box 452 indicating the sum of the fractions, determined as described above, extends beyond the demarcation 474, then it is known that the sum is greater than one (1). The student can discover how much greater than one (1) by aligning the demarcation 474 on the two-Unit box 452 with the left side of the Unit box 70, marked zero (1), or with a left side of a fraction row on the first template 300, also marked zero (0). The fraction on the template 300 that aligns with the second drawn line indicating the sum can then be found in the manner described above.

For example, the addition of five sixths and one-half (⅚+½), in the manner described above, will result in a mark in the second section 476, indicating that the sum is greater than one (1). To identify the portion of the sum greater than one (1), the demarcation 474 may be aligned with the left side (0) of the Unit box 70, if the first template 300 unit box is provided, or the left side of any of the other fraction rows to identify a fraction aligning with the mark.

If the drawn line aligns with a mark on the template 300, such as one-third (⅓), for example, then it is found that the portion of the sum that is greater than one (1) by the fraction indicated by that mark, here is one-third (⅓). It is then learned that the sum of the fraction is 1⅓. Since the first section 474 has a length equal to one (1) unit, the two-Unit boxes 452, 454, 456, 458, 460, 462, 464, 468 of the second template 450 can also be used when adding fractions whose sum is less than or equal to one (1). The student might also find that the mark aligns with two-sixths (⅖), three-ninths (⅜), or four-twelfths (4/12), which are equivalent to one-third (⅓) and are also correct.

As above, a Unit box having a length of 1.5 units may also be provided on a second template. A second template may also have different Unit boxes having lengths of one (1) unit, 1.5 units, and/or two (2) units.

In accordance with another embodiment of the invention, a permanent record of a mathematical operation may be stored in a student's notebook, notepad, or on a piece of paper, for example. In one example of this embodiment, shown in FIG. 25, a second template 500 for use with the first template 300 comprises a base 502. The base 502 may be comprised of clear plastic material. The plastic material may be rigid or semi-rigid, for example. The base 502 may also be transparent paper, such as tracing paper or other low opacity paper.

A separate, removable Unit box 504, which may also be a plate or strip of clear plastic material that is more flexible than the base, is attached to the base by adhesive. In one example the plate or strip has the same dimensions as a Unit box. In another example the plate or strip of clear plastic material is larger than the Unit box 504 and the Unit box is printed, etched, or laminated onto the plate or strip. FIG. 26 is a side view (not to scale) of the second template 500, showing the base 502, the Unit box 504, and a layer of adhesive 506 between the base and the Unit box. The plate or strip of clear plastic material for this and other examples described below is flexible enough to be peeled off the base 402 and stiff enough to mitigate the peeled plate/strip from folding and adhering to itself. In another example, the material of the base 402 is less rigid than the material of the Unit box 504 and the base is peeled off the Unit box.

As in the examples above, the Unit box 504 has the same dimension as the fraction rows of the template 300. The adhesive may be a low-tack pressure-sensitive adhesive, for example, that allows the Unit box 504 to be removed from the base and with at least some adhesive remaining on the underside of the Unit box. The Unit box 504 can thereby be attached to another surface, such as a page in the student's notebook. Low-tack pressure-sensitive adhesive and methods for applying them are known in the art. An example of a suitable low-tack pressure-sensitive adhesive is described in U.S. Pat. No. 5,194,299, which is incorporated by reference herein.

The second template 500 is used in the same manner as the second template 302 to find equivalent fractions and perform mathematical calculations. In this example, since the results of the mathematical operation is to be stored in a student's notebook, for example, marks may be made on the Unit box 504 with a non-erasable marker, such as a Sharpie®, for example. Other types of markers, pens or pencils may also be used.

As shown in FIG. 25, the result of the mathematical operation is three-quarters (¾), which is indicated on the Unit box 504 by the mark 508. The value three-quarters (¾) is also optionally written next to the mark 508, as shown in the FIG. 26, or in another location. In this example, equivalent fractions six-eighths (6/8) and nine-twelfths (9/12) are also found by the student using the first template 300 and the second template 500. The equivalent fractions are also written next to three-quarters (¾) so that the student has a record of the identifications of three-quarters (¾) and its equivalent fractions. The Unit box 504 may then be peeled off of the base 502. Some adhesive will remain on the underside of the unit box 504, as discussed above, enabling the Unit box 504 to be adhered to a page 510, such as a page in student's notebook 512, for example, as shown in FIG. 27.

Figure 28:
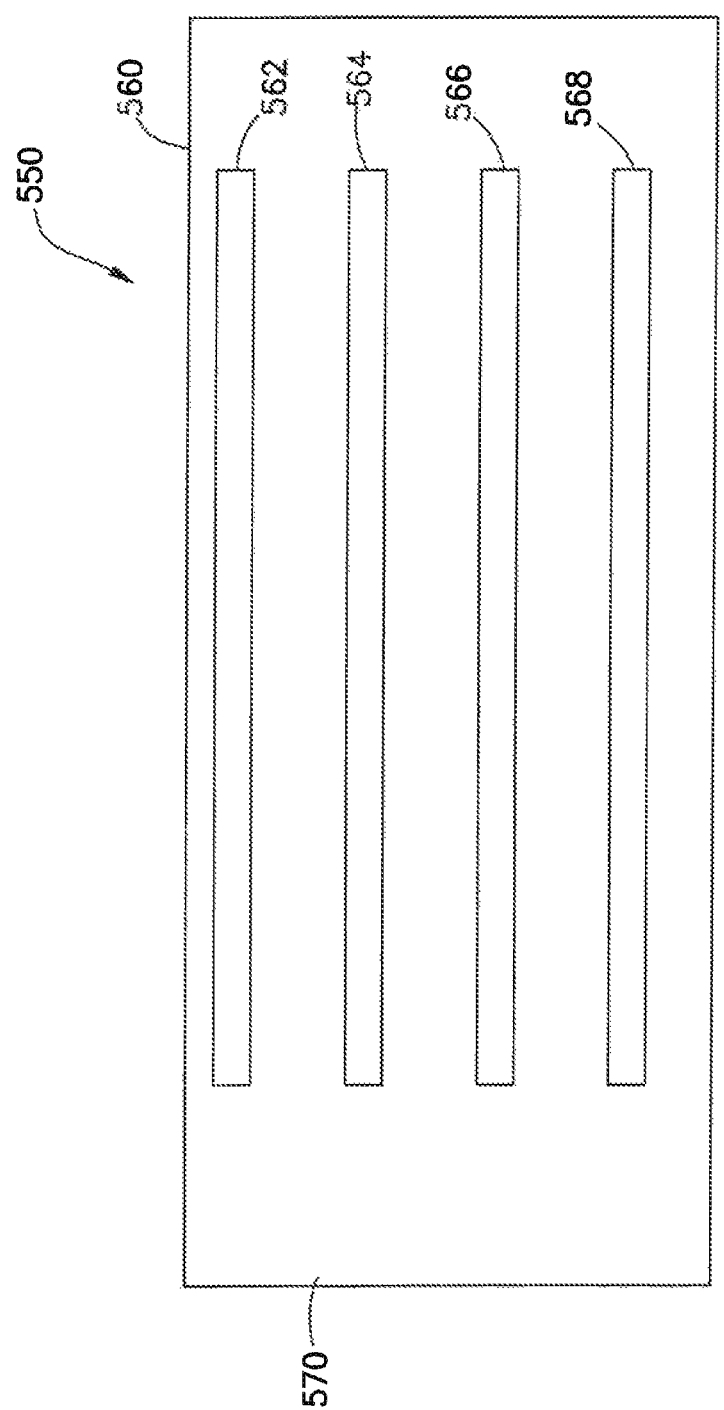
FIG. 28 is a top view of another example of a second template in accordance with this embodiment, including four (4) removable Unit boxes.

FIG. 28 is a top view of an another example of a second template 550 in accordance with this embodiment, where a second template 550 includes multiple removable Unit boxes, here four (4) Unit boxes 552, 554, 556, 558. More or fewer removable Unit boxes may be provided. As above, each Unit box 552, 554, 556, 558 is a flexible, clear plastic plate or strip attached to the base 570 by a layer of low-tack pressure-sensitive adhesive (not shown), as in FIG. 26. A student can perform one or more mathematical operations with each Unit box 552, 554, 556, 558, then peel each Unit box off the base 570 and place each Unit box onto a page, such as a page 510 in the notebook 512. Alternatively, the student can peel a respective Unit box 552, 554, 556, 558 off after it is used.

FIG. 29 is a side view of another example of a second template 600 in accordance with this embodiment, comprising a base 602 and a plurality of stacked, peelable Unit boxes 604, 606, 608, as discussed above with respect to FIGS. 25-28. An adhesive layer 610 is provided between the unit box 604 and the base 602, to attach the Unit box to the base. Similarly, a layer of adhesive 612 is provided between the Unit box 604 and the unit box 606 to attach the Unit box 606 to the Unit box 604. A layer of adhesive 614 is provided between the Unit box 608 and the Unit box 606, to attach the Unit boxes to each other. The side view of FIG. 29 is not to scale. As above, the adhesive is a low-tack pressure-sensitive adhesive, for example.

Since the base 602, the adhesive layers 610, 612 and the unit boxes 504, 606, 608 are transparent, the template 600 can be used to perform mathematical operations by moving the second template with respect to the first template 300 in the same manner as the second template 500 and the second template 302, for example. After the top unit box 608 is marked, it can be peeled off the template 600 and placed on a page, such as a page 510 in the notebook 512.

The student can then perform another mathematical operation with the text unit box 612, which becomes the top unit box, peel it off, and apply it to a page. The student can then perform another mathematical operation with the unit box 604, in the same manner. After the unit box 604 is used and applied to a page, the base 600 may be discarded. In this example, the adhesive layers may be applied to an entire bottom surface of each unit box 604, 606, 608, or to just a portion thereof.

While only three unit boxes 604, 606, 608 are shown in the template 600, in FIG. 29, more (or fewer) unit boxes may be stacked on the base 602 in the same manner as described above.

FIG. 30 is a side view of another example of a second template 650 in which the bases 652, 654, 656 are stacked and removable, such as by peeling, for example. A template 640 shown in a side view in FIG. 30, comprises a plurality of bases 602, 604, 606 upon which a Unit box is printed on, laminated on, or etched, as shown in the top view of the top Unit box 606 of FIG. 31. In this example the bases 652, 654, 656 each comprise a flexible, transparent plastic material that can be peeled off the base below it, and not fold over and adhere to itself. Adhesive layers 610, 612, 614 are applied on the underside of the bases 654 and 656 so that each base adheres to the base beneath it in the stack. As above, the adhesive is a low-tack pressure-sensitive adhesive that stays on the underside of the removed base. The adhesive may be applied to the entire underside of each base 652, 654 and 656, or to a portion thereof. A paper layer 658 may be applied to the adhesive on the underside of the base 652, so that the second template 650 may be moved with respect to the first template 300 without sticking to it. The adhesive may also be applied to the underside of the base 652.

After the top base 656 is used to perform a mathematical operation and the results marked in the Unit box 608, the base is peeled off and applied to a page, as above. The next base 654 may then be used to perform a mathematical operation. More (or fewer) bases boxes may be stacked.

As above, a guide or frame (not shown) may be provided to secure the first template 300, to support movement of any the second templates 302, 450, 500, 550, 600, and 650 with respect to the first template 300, to facilitate alignment of a mark on the second template with marks on the first template to identify equivalent fractions.

In accordance with another embodiment of the invention, a virtual template or templates corresponding to the templates 10, 150, and/or 200 and a "drawn" Unit box 100, for example, may be used on a student's or other user's processing device, such as a smart phone, tablet, laptop computer, or desk top computer, for example. In one example, a virtual piece of paper is displayed and a Unit box 100 is "drawn" on the display by clicking on an icon or using a drawing function or program, via the input device, or example. The input device may be a touchscreen of the display, a mouse, and/or a keyboard including arrow keys, for example.

A virtual template corresponding to the templates 10 or 150 may be displayed on a display of the user's processing device and aligned with the Unit box 100. The virtual template 100, 150, or 200 may be manipulated by moving the template with respect to the Unit box 100 with an input device, such by a mouse, as arrow keys on a keypad, an arrow displayed on the screen, or a touchscreen, for example. By clicking on a slot corresponding to a selected fraction with a pointer or with a displayed icon, for example, a line or other such mark indicating a first fraction can be drawn in the Unit box. In another example, a fraction may be selected by clicking on a respective fraction on the template without aligning the template with the Unit box 100, or a fraction may be selected from in a displayed list of fractions.

The displayed template 100, 150, or 200 may be manipulated by moving the template with respect to a line or other such mark "drawn" on the screen in the Unit box 100 representing a first fraction, to identify equivalent fractions, via an input device. Similarly, the template can be moved with respect to lines representing the sum or difference between fractions, to find fractions equivalent to the sum or difference. In another example, a virtual row of fractions may be moved with respect to the virtual template to find equivalent fractions on the display.

In an example of a virtual version of a first template 300 and a second template 302, the first template can be displayed and then the second template with a displayed Unit box 304 can be positioned over and moved with respect to the first template by clicking on and dragging the second template via the input device or through the use of arrow keys or a displayed arrow on the screen, for example. A line can be "drawn" on the second template by clicking on the fraction aligned with the Unit box 302 on the display, or by clicking on an icon, for example. Identifying equivalent fractions and performing mathematical operations may be performed via the virtual first template 300 and the second virtual template 302, as described above.

Figure 32:
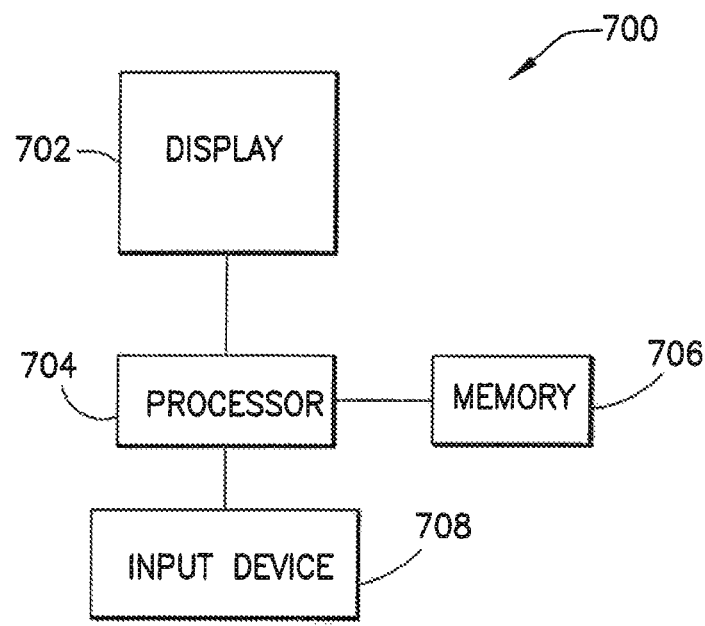
FIG. 32 is a block diagram of a system for implementing a virtual template as in FIGS. 1, 10, and 11, or a virtual first template and a virtual second template, as in FIGS. 12 and 13, in accordance with another embodiment of the invention.

FIG. 32 is a block diagram of a system 700 for implementing a virtual template 10, 150, or 200, or the first template 300 and the second template 302, in accordance with this embodiment of the invention. The system 700 comprises a display device 702 controlled by a processing device 704. The processing device 704 is controlled by an equivalent fraction template software package that can be downloaded to the memory 704 via the Internet or can be loaded via a computer readable device, such as a disk, for example. An input device 706, such as a mouse or keyboard for example, may be used to manipulate templates on the display 702, as discussed above. In another example, the display device 702 may include a touch-screen input device. As discussed above, the system may be a smartphone, tablet, laptop computer, or desktop computer for example.

As discussed above, the rectangular rows 14-32 can be lines and the elongated slot 70 can define a line in the template 10 of FIG. 1. FIG. 33 is a front view of an example of a template 750 having such a configuration. Fraction rows defining the fractions Seconds (2nds), Thirds (3rds), Quarters (4ths), Fifths (5ths), Sixths (6ths), Sevenths (7ths), Eighths (8ths), Ninths (9ths), Tenths (10ths), Twelfths (12ths). Since each fraction row is a line, there is additional room for multiple rows of fractions. Fractions not included on the template 10, such as Sevenths (7ths), Elevenths (11ths), and Thirteenths (13ths) may be included in the template 750, for example. In this example, vertical slots, such as the slots identifying one-half (½) in the Seconds (2nds) row, and the slots identifying one-third (⅓) and two-thirds (⅔) in the Thirds row, are perpendicular to the lines defining the respective fractions. In this example, the vertical slots are bisected by the lines defining the respective fractions, but that is not required. The vertical slots may extend completely above or completely below the fraction lines. As discussed above, the slots may have other shapes.

An elongated slot 752 is also shown. The elongated slot 752 has the same length as the fraction rows. The height of the elongated slot 752 is slightly more than the width of a writing implement, such as the lead of a lead pencil or the tip of a pen, so that a Unit line can be drawn on a surface with the writing implement by following the elongated slot. The height of the elongated slot may be from 0.1 mm to 3.0 mm, for example. Vertical slots 754, 756 may be provided at the ends of the elongated slot 752 so that when the drawn Unit line will have vertical boundaries. In this example, part of each vertical slot 754, 756, such as half the vertical slot, extends above the elongated slot 754, and part, such as half, extends below the elongated slot. In other examples, the vertical slots 754, 756 may extend completely above or below the elongated slot 754, 756. The vertical slots 754, 756 may have other shapes, instead.

As noted above, holes may be provided on the left side of the template 10 so that the template may be clipped into a loose leaf or other such notebook, for example. Five holes 758 are provided in the template 750, for example.

To use the template 750, the template is placed on a surface, such as a piece of paper, and Unit line is drawn on the surface by drawing a line through the elongated slot 752. Vertical boundaries are drawn at each end of the Unit line by drawing lines in the vertical slots 754, 756. A mark indicating a respective fraction may then be drawn on the Unit line by moving the template 750 with respect to the drawn Unit line to align a respective fraction row with the drawn Unit line, as described above. Then a mark or small line may be drawn in the slot identifying a respective fraction on the drawn Unit line. Mathematical operations, such as identifying equivalent fractions and performing addition and subtraction, may then be performed in the manners described above.

It would be apparent to one of ordinary skill in the art that the first template 300 may also be modified to define fraction rows by horizontal lines and respective fractions by short vertical lines that are perpendicular to the fraction line. The second template 302 may be similarly modified to provide a Unit line. The second template 302 may then be placed over the first template to align the Unit line with a fraction row on the first template, and a marks, such as a small lines, may be drawn on the Unit line. Similarly, the second templates 500, 550, 600, and 650 may have printed, laminated, or embedded a Unit line instead of a Unit box. Multiple Unit lines may be provided on a single second template, as in FIG. 23, and Unit lines having lengths of 1.5 units or two (2) units may also be provided on second templates. Mathematical operations may then be performed in the manners described above.

Examples of implementations of embodiments of the invention are described above. It would be apparent to one of ordinary skill in the art that modifications may be made to the examples above without departing from the spirit and scope of the invention, which is described in the following claims.

I claim:

1. An apparatus for identifying equivalent fractions, comprising:
   a plate defining a plane and a plurality of aligned rows, each row defined by a rectangle printed on the plate having an equal length and representing a respective fraction;
   each row having a first side, a second side opposite the first side, a top side, and a bottom side opposite the top side, wherein the first sides of each row are vertically aligned and the second sides of each row are vertically aligned;
   a plurality of vertical slots through the plate, each of the vertical slots being located in a position in a respective rectangle to divide a respective row into a number of equal parts, number of vertical slots in a respective row corresponding to the fraction defined by the respective row, the number of parts being equal to a value of the denominator of the fraction defined by the respective row; and
   wherein vertical slots in rows corresponding to equivalent fractions are vertically aligned with one another and wide enough for a line or other indication to be drawn in the slot, on a surface, with a writing implement.

2. The apparatus of claim 1, wherein:
   the plate defines an elongated slot through the plate, the elongated slot for drawing a boundary on a solid surface and having dimensions about equal to dimensions of each row.

3. The apparatus of claim 2, wherein:
   the plurality of aligned rows extend horizontally;
   the elongated slot extends horizontally; and
   the elongated slot has left and right sides aligned with left and right sides of the plurality of aligned rows, respectively.

4. The apparatus of claim 1, wherein the number of vertical slots in each row is one less than the number of equal parts corresponding to the respective fraction defined by a respective row.

5. The apparatus of claim 1, further comprising:
   a second template separate from the first template, the second template comprising a second plate defining an elongated slot having dimensions equal to or greater than the dimensions of the plurality of aligned rows of the first template for drawing a boundary on a solid surface having dimensions about equal to dimensions of each row.

6. The apparatus of claim 5, wherein the second template further comprises: a second elongated slot having a length greater than the length of the first elongated slot.

7. Apparatus for identifying equivalent fractions, comprising:
   a first plate defining a plane and a plurality of aligned first rows, each first row having an equal length and representing a respective fraction;
   each first row having a first side, a second side opposite the first side, a top side, and a bottom side opposite the top side, wherein the first sides of each first row are vertically aligned and the second sides of each row are vertically aligned;
   each first row defining at least one mark on the plate, the at least one mark being fixedly, and non-movably, arranged in the plane containing the first plate, each of the at least one mark being located in a position in the row to divide a respective row into a number of equal parts corresponding to the fraction defined by the respective row, the number of parts being equal to a value of the denominator of the fraction defined by the respective row, wherein marks in rows corresponding to equivalent fractions are vertically aligned; and a second, transparent plate separate from the first plate, the second plate defining a boundary having the same dimensions as the marks on the first plate, wherein, when the second plate is placed on top of the first plate, the second row aligns with a selected one of the first rows, wherein a line or other indication is drawn on the second, transparent plate when in alignment with marks on the first plate by a writing implement.

8. The apparatus of claim 7, wherein a number of marks in each row is one less than the number of equal parts corresponding to the respective fraction defined by a respective row.

9. The apparatus of claim 7, wherein the second plate comprises a plurality of second rows having the same dimensions.

10. The apparatus of claim 7, wherein the second plate comprises a removable second row.

11. The apparatus of claim 10, wherein the second template comprises:

a base;

a removable strip; and adhesive on an underside of the removable strip, the adhesive being configured to adhere the removable strip to the base, so that when the removable strip is removed from the base, adhesive remains on the removable strip so that, by the remaining adhesive, the removable strip is configured to be adhere-able to another surface;

wherein the boundary is defined on the removable strip.

* * * * *